United States Patent
Chen et al.

(10) Patent No.: US 11,425,739 B2
(45) Date of Patent: Aug. 23, 2022

(54) SCHEDULING METHOD AND DEVICE

(71) Applicant: HUAWEI TECHNOLOGIES CO., LTD., Guangdong (CN)

(72) Inventors: Lei Chen, Shenzhen (CN); Fengwei Liu, Chengdu (CN); Jing Qiu, Chengdu (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 36 days.

(21) Appl. No.: 16/881,275

(22) Filed: May 22, 2020

(65) Prior Publication Data

US 2020/0288485 A1    Sep. 10, 2020

Related U.S. Application Data

(63) Continuation of application No. PCT/CN2018/117006, filed on Nov. 22, 2018.

(30) Foreign Application Priority Data

Nov. 23, 2017   (CN) .......................... 201711185048.4

(51) Int. Cl.
*H04W 72/12* (2009.01)
*H04W 28/26* (2009.01)
(Continued)

(52) U.S. Cl.
CPC ....... *H04W 72/1257* (2013.01); *H04W 28/26* (2013.01); *H04W 72/042* (2013.01); *H04W 72/0446* (2013.01); *H04W 80/08* (2013.01)

(58) Field of Classification Search
None
See application file for complete search history.

(56) References Cited

U.S. PATENT DOCUMENTS

| | | | |
|---|---|---|---|
| 2008/0043647 A1* | 2/2008 | Yoshida | H04B 7/15528 370/280 |
| 2010/0177672 A1* | 7/2010 | Dayal | H04W 52/46 370/311 |

(Continued)

FOREIGN PATENT DOCUMENTS

| | | |
|---|---|---|
| CN | 1713770 A | 12/2005 |
| CN | 101064554 A | 10/2007 |

(Continued)

OTHER PUBLICATIONS

Extended European Search Report issued in European Application No. 18880602.0 dated Oct. 21, 2020 (eight pages).

(Continued)

*Primary Examiner* — Jay L Vogel

(57) ABSTRACT

A scheduling method implements flexible scheduling in a relay network. A method includes: determining, by a first device, information about a transmission time difference, where the transmission time difference is a time difference between a control channel of a first link and a data channel that is of the first link and that is scheduled by the control channel of the first link; notifying a second device of the information about the transmission time difference; and performing, by the second device, scheduling based on the information about the transmission time difference. In this way, the second device determines whether a resource needs to be reserved for the data channel of the first link, and it is possible that a time division resource, a frequency division resource, or a space division resource is shared for data of the first link and data of a second link.

11 Claims, 12 Drawing Sheets

(51) Int. Cl.
*H04W 72/04* (2009.01)
*H04W 80/08* (2009.01)
*H04L 5/00* (2006.01)
*H04W 84/04* (2009.01)

(56) References Cited

U.S. PATENT DOCUMENTS

| | | | | |
|---|---|---|---|---|
| 2011/0103292 | A1* | 5/2011 | Pasad | H04L 5/0053 370/315 |
| 2014/0003396 | A1* | 1/2014 | Yu | H04W 72/1247 370/335 |
| 2019/0174432 | A1* | 6/2019 | Wang | H04W 52/365 |
| 2020/0059760 | A1 | 2/2020 | Li et al. | |

FOREIGN PATENT DOCUMENTS

| | | |
|---|---|---|
| CN | 101127553 A | 2/2008 |
| CN | 101562557 A | 10/2009 |
| CN | 101931875 A | 12/2010 |
| CN | 102577568 A | 7/2012 |
| CN | 105009474 A | 10/2015 |
| CN | 106559188 A | 4/2017 |
| CN | 107333246 A | 11/2017 |
| EP | 2217012 A1 | 8/2010 |
| WO | 2010064828 A2 | 6/2010 |
| WO | 2014124164 A1 | 8/2014 |

OTHER PUBLICATIONS

Chinese Office Action issued in Chinese Application No. 201711185048.4 dated Jun. 16, 2022 (6 pages).

* cited by examiner

SCHEDULING METHOD AND DEVICE

CROSS-REFERENCE TO RELATED APPLICATIONS

This application is a continuation of International Application No. PCT/CN2018/117006, filed on Nov. 22, 2018, which claims priority to Chinese Patent Application No. 201711185048.4, filed on Nov. 23, 2017. The disclosures of the aforementioned applications are hereby incorporated by reference in their entireties.

TECHNICAL FIELD

The present invention relates to the field of communications technologies, and in particular, to a scheduling method and a device.

BACKGROUND

A relay technology is introduced into a 4G LTE system. A relay node (RN for short) deployed in a network is used to forward data between a base station (BS for short) and a terminal device, to increase a network capacity and resolve a coverage hole problem. Due to a half-duplex constraint of a radio frequency device, the relay node cannot receive data when sending data, or cannot send data when receiving data. A conflict between signal sending and signal receiving may be referred to as a sending and receiving conflict. To avoid a sending and receiving conflict, in an LTE relaying solution, an RN cannot simultaneously perform transmission on a backhaul link and an access link. A link between a donor eNB (English full name: Donor eNB (evolved node B), DeNB for short) and the relay node may be referred to as the backhaul link, and a link between the relay node and User Equipment (UE) may be referred to as the access link. The DeNB transmits a signal (namely, a downlink signal on the backhaul link) to the RN in a preset multicast broadcast service single frequency network (MBSFN for short) subframe. There is no signal on the access link transmitted in this subframe. The RN transmits a signal (namely, an uplink signal on the backhaul link) to the DeNB in an uplink subframe of the RN. In this subframe, the RN does not schedule uplink data that is on the access link, to avoid the sending and receiving conflict. According to this mechanism, both downlink transmission and uplink transmission on the backhaul link exclusively occupy resources, avoiding the sending and receiving conflict between the backhaul link and the access link. In this technical solution, a manner of reserving resources is used to avoid the sending and receiving conflict. Specifically, even if transmission is not performed on the backhaul link or the backhaul link does not occupy all resources, the unoccupied resources of the backhaul link cannot be used for the access link.

A new radio (NR for short) system also supports the relay technology. An integrated access and backhaul (IAB for short) technology is introduced into NR. The IAB technology needs to more flexibly support resource allocation of an access link and a backhaul link. In the NR system, a backhaul link scheduling method needs to be provided, to support flexible resource allocation of the access link and the backhaul link.

SUMMARY

In view of this, it is necessary to provide a scheduling method and a device, to provide scheduling flexibility.

To achieve the foregoing objective, the following technical solutions are used in embodiments of the present invention.

According to a first aspect, a scheduling method is provided, and includes: determining, by a first device, information about a transmission time difference, where the transmission time difference is a time difference between a control channel of a first link and a data channel that is of the first link and that is scheduled by the control channel of the first link; the first link is a link between the first device and a second device; the first device includes a base station and the second device includes a first relay device, or the first device includes a second relay device and the second device includes a third relay device; the control channel of the first link is a channel used to send control information of the first link on the first link; and the data channel of the first link is a channel used to send data on the first link; and sending, by the first device, the information about the transmission time difference to the second device.

Optionally, the information about the transmission time difference includes at least one of the following: information (1) about the transmission time difference: information about a value N of the transmission time difference; information (2) about the transmission time difference: information that the transmission time difference is greater than or equal to M or information that the transmission time difference is greater than M; information (3) about the transmission time difference: information that the transmission time difference is less than or equal to K or information that the transmission time difference is less than K; information (4) about the transmission time difference: information that the transmission time difference is greater than or equal to M or information that the transmission time difference is greater than M, and information about a value N of the transmission time difference; or information (5) about the transmission time difference: information that the transmission time difference is less than or equal to K or information that the transmission time difference is less than K, and information about a value N of the transmission time difference, where N is greater than or equal to 0, M is greater than or equal to 0, and K is greater than or equal to 0.

Optionally, the sending, by the first device, the information about the transmission time difference to the second device includes at least one of the following manners: a sending manner (1): the first device sends the information (1) about the transmission time difference to the second device by using higher layer signaling or physical layer signaling; a sending manner (2): the first device sends the information (2) or (3) about the transmission time difference to the second device by using higher layer signaling; a sending manner (3): the first device sends the following information to the second device by using higher layer signaling: the information that the transmission time difference is greater than or equal to M or the information that the transmission time difference is greater than M; and the first device sends the information about the value N of the transmission time difference to the second device by using physical layer signaling; or a sending manner (4): the first device sends the following information to the second device by using higher layer signaling: the information that the transmission time difference is less than or equal to K or the information that the transmission time difference is less than K; and the first device sends the information about the value N of the transmission time difference to the second device by using physical layer signaling.

Optionally, the scheduling method further includes: receiving, by the first device, processing delay information that is of the second device and that is sent by the second device.

Optionally, the determining, by a first device, information about a transmission time difference includes: determining, by the first device, the information about the transmission time difference based on the processing delay information.

According to a second aspect, an embodiment of the present invention provides a scheduling method, including: receiving, by a second device, information about a transmission time difference that is sent by a first device, where the transmission time difference is a time difference between a control channel of a first link and a data channel that is of the first link and that is scheduled by the control channel of the first link; the first link is a link between the first device and the second device; the first device includes a base station and the second device includes a first relay device, or the first device includes a second relay device and the second device includes a third relay device; the control channel of the first link is a channel used to send control information of a backhaul link on the first link; and the data channel of the first link is a channel used to send data on the first link; and performing, by the second device, scheduling based on the information about the transmission time difference.

Optionally, for the information about the transmission time difference, refer to the first aspect.

Optionally, the receiving, by a second device, information about a transmission time difference that is sent by a first device includes: receiving, by the second device in at least one of the following manners, the information about the transmission time difference that is sent by the first device: a receiving manner (1): the second device receives the information (1) about the transmission time difference that is sent by the first device by using higher layer signaling or physical layer signaling; a receiving manner (2): the second device receives the information (2) or (3) about the transmission time difference that is sent by the first device by using higher layer signaling; a receiving manner (3): the second device receives the following information sent by the first device by using higher layer signaling: the information that the transmission time difference is greater than or equal to M or the information that the transmission time difference is greater than M; and the second device receives the information about the value N that is of the transmission time difference and that is sent by the first device by using physical layer signaling; or a receiving manner (4): the second device receives the following information sent by the first device by using higher layer signaling: the information that the transmission time difference is less than or equal to K or the information that the transmission time difference is less than K; and the second device receives the information about the value N that is of the transmission time difference and that is sent by the first device by using physical layer signaling.

Optionally, the performing, by the second device, scheduling based on the information about the transmission time difference includes: determining, by the second device based on the information about the transmission time difference, whether a resource needs to be reserved for the data channel of the first link; and/or scheduling, by the second device, a second link based on the information about the transmission time difference, where the second link is a link between the second device and a third device, and the third device includes a terminal or a fourth relay device.

Optionally, the determining, by the second device based on the information about the transmission time difference, whether a resource needs to be reserved for the data channel of the first link includes at least one of the following manners: a scheduling manner (1): when the information about the transmission time difference includes the information (1) about the transmission time difference, if the value N of the transmission time difference is greater than a processing delay of the second device, the second device does not reserve a resource for the data channel of the first link; a scheduling manner (2): when the information about the transmission time difference includes the information (1) about the transmission time difference, if the value N of the transmission time difference is less than or equal to a processing delay of the second device, the second device reserves a resource for the data channel of the first link; a scheduling manner (3): when the information about the transmission time difference includes the information (2) or (4) about the transmission time difference, the second device does not reserve a resource for the data channel of the first link; or a scheduling manner (4): when the information about the transmission time difference includes the information (3) or (5) about the transmission time difference, the second device reserves a resource for the data channel of the first link.

Optionally, the scheduling method further includes: if the information about the transmission time difference includes the value N of the transmission time difference, determining, by the second device, a location of the data channel of the first link based on the value N of the transmission time difference.

Optionally, the scheduling, by the second device, a second link based on the information about the transmission time difference includes at least one of the following manners: a scheduling manner (5): if the second device reserves a resource for the data channel of the first link, the second device schedules the second link on a resource other than the reserved resource; or a scheduling manner (6): if the second device does not reserve a resource for the data channel of the first link, the second device dynamically schedules the second link.

Optionally, in the scheduling mode (5), when a dynamic TDD mode is used, spatial multiplexing is performed on a resource occupied by the data channel of the first link and a resource occupied by a data channel of the second link; or in the scheduling mode (6), time-division multiplexing, frequency-division multiplexing, or spatial multiplexing is performed on a resource occupied by the data channel of the first link and a resource occupied by a data channel of the second link.

Optionally, the scheduling method further includes: sending, by the second device, processing delay information of the second device to the first device.

According to a third aspect, an embodiment of the present invention provides a first device, including: a processing unit, configured to determine information about a transmission time difference, where the transmission time difference is a time difference between a control channel of a first link and a data channel that is of the first link and that is scheduled by the control channel of the first link; the first link is a link between the first device and a second device; the first device includes a base station and the second device includes a first relay device, or the first device includes a second relay device and the second device includes a third relay device; the control channel of the first link is a channel used to send control information of the first link on the first link; and the data channel of the first link is a channel used to send data on the first link; and a sending unit, configured to send the information about the transmission time difference to the second device.

Optionally, for the information about the transmission time difference, refer to the first aspect.

Optionally, the sending unit is configured to send the information about the transmission time difference to the second device in at least one of the following manners: a sending manner (1): the sending unit sends the information (1) about the transmission time difference to the second device by using higher layer signaling or physical layer signaling; a sending manner (2): the sending unit sends the information (2) or (3) about the transmission time difference to the second device by using higher layer signaling; a sending manner (3): the sending unit sends the following information to the second device: the information that the transmission time difference is greater than or equal to M or the information that the transmission time difference is greater than M; and the sending unit sends the information about the value N of the transmission time difference to the second device by using physical layer signaling; or a sending manner (4): the sending unit sends the following information to the second device by using higher layer signaling: the information that the transmission time difference is less than or equal to K or the information that the transmission time difference is less than K; and the sending unit sends the information about the value N of the transmission time difference to the second device by using physical layer signaling.

Optionally, the first device further includes a receiving unit, configured to receive processing delay information that is of the second device and that is sent by the second device.

Optionally, the processing unit is configured to determine the information about the transmission time difference based on the processing delay information.

According to a fourth aspect, an embodiment of the present invention provides a second device, including: a receiving unit, configured to receive information about a transmission time difference that is sent by a first device, where the transmission time difference is a time difference between a control channel of a first link and a data channel that is of the first link and that is scheduled by the control channel of the first link; the first link is a link between the first device and the second device; the first device includes a base station and the second device includes a first relay device, or the first device includes a second relay device and the second device includes a third relay device; the control channel of the first link is a channel used to send control information of a backhaul link on the first link; and the data channel of the first link is a channel used to send data on the first link; and a processing unit, configured to perform scheduling based on the information about the transmission time difference.

Optionally, for the information about the transmission time difference, refer to the first aspect.

Optionally, the receiving unit is configured to receive, in at least one of the following manners, the information about the transmission time difference that is sent by the first device: a receiving manner (1): the receiving device receives the information (1) about the transmission time difference that is sent by the first device by using higher layer signaling or physical layer signaling; a receiving manner (2): the receiving device receives the information (2) or (3) about the transmission time difference that is sent by the first device by using higher layer signaling; a receiving manner (3): the receiving device receives the following information sent by the first device by using higher layer signaling: the information that the transmission time difference is greater than or equal to M or the information that the transmission time difference is greater than M; and the receiving device receives the information about the value N that is of the transmission time difference and that is sent by the first device by using physical layer signaling; or a receiving manner (4): the receiving device receives the following information sent by the first device by using higher layer signaling: the information that the transmission time difference is less than or equal to K or the information that the transmission time difference is less than K; and the receiving device receives the information about the value N that is of the transmission time difference and that is sent by the first device by using physical layer signaling.

Optionally, the processing unit is configured to: determine, based on the information about the transmission time difference, whether a resource needs to be reserved for the data channel of the first link, and/or schedule a second link based on the information about the transmission time difference, where the second link is a link between the second device and a third device, and the third device includes a terminal or a fourth relay device.

Optionally, the processing unit is configured to determine, in at least one of the following manners, whether the resource needs to be reserved for the data channel of the first link: a scheduling manner (1): when the information about the transmission time difference includes the information (1) about the transmission time difference, if the value N of the transmission time difference is greater than a processing delay of the second device, the processing unit does not reserve a resource for the data channel of the first link; a scheduling manner (2): when the information about the transmission time difference includes the information (1) about the transmission time difference, if the value N of the transmission time difference is less than or equal to a processing delay of the second device, the processing unit reserves a resource for the data channel of the first link; a scheduling manner (3): when the information about the transmission time difference includes the information (2) or (4) about the transmission time difference, the processing unit does not reserve a resource for the data channel of the first link; or a scheduling manner (4): when the information about the transmission time difference includes the information (3) or (5) about the transmission time difference, the processing unit reserves a resource for the data channel of the first link.

Optionally, the processing unit schedules the second link in at least one of the following manners: a scheduling manner (5): if the processing unit reserves a resource for the data channel of the first link, the processing unit schedules the second link on a resource other than the reserved resource; or a scheduling manner (6): if the processing unit does not reserve a resource for the data channel of the first link, the processing unit dynamically schedules the second link.

Optionally, in the scheduling mode (5), when a dynamic TDD mode is used, spatial multiplexing is performed on a resource occupied by the data channel of the first link and a resource occupied by a data channel of the second link; or in the scheduling mode (6), time-division multiplexing, frequency-division multiplexing, or spatial multiplexing is performed on a resource occupied by the data channel of the first link and a resource occupied by a data channel of the second link.

Optionally, the second device further includes: sending, by the second device, processing delay information of the second device to the first device.

According to a fifth aspect, an embodiment of the present invention provides a scheduling method, including: determining, by a first device, configuration information of a control channel of a first link, where the first link is a link between the first device and a second device; the first device includes a base station and the second device includes a first relay device, or the first device includes a second relay device and the second device includes a third relay device; the control channel of the first link is a channel used to send control information of the first link on the first link; and the configuration information of the control channel of the first link includes information about a time domain resource occupied by the control channel of the first link; sending, by the first device, the configuration information of the control channel of the first link to the second device; and sending, by the first device, the control information of the first link to the second device on the control channel of the first link.

Optionally, a time-frequency resource occupied by the control channel of the first link and a time-frequency resource occupied by a control channel of a second link overlap or partially overlap, the second link is a link between the second device and a third device, and the third device includes a terminal or a fourth relay device.

Optionally, time-division multiplexing is performed on a time-frequency resource occupied by the control channel of the first link and a time-frequency resource occupied by a control channel of a second link, the second link is a link between the second device and a third device, and the third device includes a terminal or a fourth relay device.

Optionally, the configuration information of the control channel of the first link includes aperiodic configuration information of the control channel of the first link and/or periodic configuration information of the control channel of the first link.

Optionally, the aperiodic configuration information of the control channel of the first link includes location information of the time domain resource occupied by the control channel of the first link.

Optionally, the sending, by the first device, the configuration information of the control channel of the first link to the second device includes: sending, by the first device, the aperiodic configuration information of the control channel of the first link to the second device by using DCI or a MAC-CE.

Optionally, the periodic configuration information of the control channel of the first link includes information about a transmission period of the control channel of the first link.

Optionally, the periodic configuration information of the control channel of the first link further includes offset information of the transmission period of the control channel of the first link.

Optionally, the sending, by the first device, the configuration information of the control channel of the first link to the second device includes: sending, by the first device, the periodic configuration information of the control channel of the first link to the second device by using RRC signaling.

Optionally, the scheduling method further includes: sending, by the first device, indication information to the second device, where the indication information is used to instruct the second device to activate or deactivate the configuration information of the control channel of the first link.

According to a sixth aspect, an embodiment of the present invention provides a scheduling method, including: receiving, by a second device, configuration information that is of a control channel of a first link and that is sent by a first device, where the first link is a link between the first device and the second device; the first device includes a base station and the second device includes a first relay device, or the first device includes a second relay device and the second device includes a third relay device; the control channel of the first link is a channel used to send control information of the first link on the first link; and the configuration information of the control channel of the first link includes information about a time domain resource occupied by the control channel of the first link; and monitoring, by the second device based on the configuration information of the control channel of the first link, the control information that is of the first link and that is sent by the first device to the second device on the control channel of the first link.

Optionally, for a limitation on a time-frequency resource occupied by the control channel of the first link or the configuration information of the control channel of the first link, refer to the description in the fifth aspect. Details are not described herein.

Optionally, the receiving, by a second device, configuration information that is of a control channel of a first link and that is sent by a first device includes: receiving, by the second device, the aperiodic configuration information that is of the control channel of the first link and that is sent by the first device by using DCI or a MAC-CE.

Optionally, the receiving, by a second device, configuration information that is of a control channel of a first link and that is sent by a first device includes: receiving, by the second device, the periodic configuration information that is of the control channel of the first link and that is sent by the first device by using RRC signaling.

Optionally, the scheduling method further includes: receiving, by the second device, indication information sent by the first device, where the indication information is used to instruct the second device to activate or deactivate the configuration information of the control channel of the first link.

According to a seventh aspect, an embodiment of the present invention provides a first device, including: a processing unit, configured to determine configuration information of a control channel of a first link, where the first link is a link between the first device and a second device; the first device includes a base station and the second device includes a first relay device, or the first device includes a second relay device and the second device includes a third relay device; the control channel of the first link is a channel used to send control information of the first link on the first link; and the configuration information of the control channel of the first link includes information about a time domain resource occupied by the control channel of the first link; and a sending unit, configured to send the configuration information of the control channel of the first link to the second device, where the sending unit is further configured to send the control information of the first link to the second device on the control channel of the first link.

Optionally, for a limitation on a time-frequency resource occupied by the control channel of the first link or the configuration information of the control channel of the first link, refer to the description in the fifth aspect. Details are not described herein.

Optionally, the sending unit is configured to send the aperiodic configuration information of the control channel of the first link to the second device by using DCI or a MAC-CE.

Optionally, the sending unit is configured to send the periodic configuration information of the control channel of the first link to the second device by using RRC.

Optionally, the sending unit is further configured to send, by the first device, indication information to the second device, where the indication information is used to instruct the second device to activate or deactivate the configuration information of the control channel of the first link.

According to an eighth aspect, an embodiment of the present invention provides a second device, including: a receiving unit, configured to receive configuration information that is of a control channel of a first link and that is sent by a first device, where the first link is a link between the first device and the second device; the first device includes a base station and the second device includes a first relay device, or the first device includes a second relay device and the second device includes a third relay device; the control channel of the first link is a channel used to send control information of the first link on the first link; and the configuration information of the control channel of the first link includes information about a time domain resource occupied by the control channel of the first link; and the processing unit, configured to control the receiving unit to monitor, based on the configuration information of the control channel of the first link, the control information that is of the first link and that is sent by the first device to the second device on the control channel of the first link.

Optionally, for a limitation on a time-frequency resource occupied by the control channel of the first link or the configuration information of the control channel of the first link, refer to the description in the fifth aspect. Details are not described herein.

Optionally, the receiving unit is configured to receive the aperiodic configuration information that is of the control channel of the first link and that is sent by the first device by using DCI or a MAC-CE.

Optionally, the receiving unit is configured to receive the periodic configuration information that is of the control channel of the first link and that is sent by the first device by using RRC.

Optionally, the second device further includes: the receiving unit is configured to receive indication information sent by the first device, where the indication information is used to instruct the second device to activate or deactivate the configuration information of the control channel of the first link.

According to a ninth aspect, an embodiment of the present invention provides a device. The device includes a processor, the memory is coupled to the processor, and the processor runs code in the memory, so that the device performs the scheduling method according to any one of the first aspect, the second aspect, the fifth aspect, or the sixth aspect.

According to a tenth aspect, an embodiment of the present invention provides a readable storage medium. The readable storage medium stores an instruction, and when the instruction stored in the readable storage medium is run on a device, the device is enabled to perform the scheduling method according to any one of the first aspect, the second aspect, the fifth aspect, or the sixth aspect.

According to an eleventh aspect, an embodiment of the present invention provides a computer program product. When the computer program product is run on a computer, the computer is enabled to perform the scheduling method according to any one of the first aspect, the second aspect, the fifth aspect, or the sixth aspect.

In the embodiments of the present invention, the first device sends the information about the transmission time difference to the second device, and the second device may perform scheduling based on the information about the transmission time difference. This ensures scheduling flexibility.

DESCRIPTION OF EMBODIMENTS

The following clearly describes the technical solutions in the embodiments of the present invention with reference to the accompanying drawings in the embodiments of the present invention. The described embodiments are only some but not all of the embodiments of the present invention.

In the specification, the claims, and the accompanying drawings the terms "first", "second", and the like are intended to distinguish between similar objects but are not necessarily intended to describe a specific order or sequence. It should be understood that the data used in such a way is interchangeable in proper circumstances, so that the embodiments described herein can be implemented in other orders than the order other illustrated or described herein. In addition, the terms "include", "have", or any other variant thereof are intended to cover a non-exclusive inclusion. For example, a process, a method, a system, a product, or a device that includes a series of steps or modules is not necessarily limited to the steps or modules that are expressly listed, but may include another step or module not expressly listed or inherent to the process, the method, the product, or the device. The division into the modules in this specification is merely logical division, and there may be another division during implementation in actual application. For example, a plurality of modules may be combined or integrated into another system, or some features may be ignored or not performed. In addition, the displayed or discussed mutual couplings, direct couplings, or communication connections may be implemented through some interfaces, and the indirect couplings or communication connections between the modules may be implemented in electronic or another form. This is not limited in this specification. In addition, modules or sub-modules described as separate components may be or may not be physically separated, may be or may not be physical modules, or may be distributed to a plurality of circuit modules. Objectives of the solutions of the embodiments of the present invention may be achieved by selecting some or all of the modules according to actual requirements.

The embodiments of the present invention provide a method and device for notifying capability information of a communications device, to implement communication between communications devices. The communications devices include a terminal device and a network device.

Figure 1:
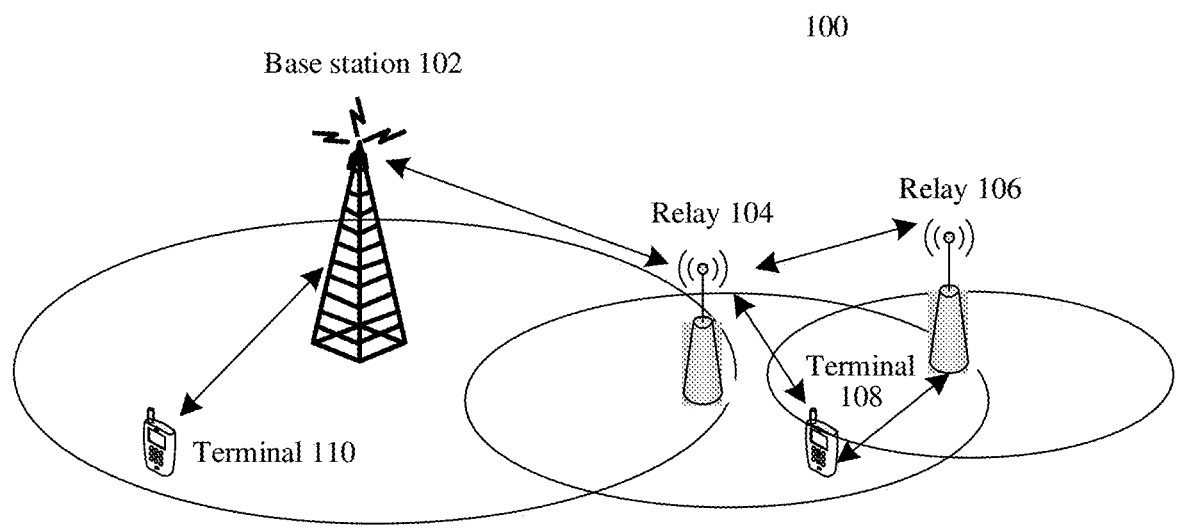
FIG. 1 is a schematic diagram of a communications system to which an embodiment of the present invention is applicable.

FIG. 1 is a schematic diagram of a communications system 100 to which an embodiment of the present invention is applicable.

It should be noted that the communications system 100 in this embodiment of this application includes but is not limited to: a narrowband internet of things (NB-IoT for short) system, a global system for mobile communications (GSM for short), an enhanced data rates for GSM evolution (EDGE for short) system, a wideband code division multiple access (WCDMA for short) system, a code division multiple access 2000 (CDMA2000 for short) system, a time division-synchronous code division multiple access (TD-SCDMA for short) system, a long term evolution (LTE for short) system, and a next-generation mobile communications system such as a future evolved fifth generation mobile communications (5G) system or a new radio (NR) system. As shown in FIG. 1, the wireless communications system 100 may include a base station 102, a terminal 108, 110, and a relay device 104, 106. There may be no relay device 104, 106 between the base station 102 and the terminal 108, 110, or there may be at least one relay device 104, 106 between the base station 102 and the terminal 108. For example, the wireless communications system 100 may be a multi-hop relay system, and there are at least two relay devices 104 and 106 between the base station 102 and the terminal 108.

The base station 102 may be configured to communicate with one or more terminals 108, 110, or may be configured to communicate with one or more base stations that have some terminal functions (for example, communication between a macro base station and a micro base station such as an access point). The base station 102 includes but is not limited to: the base station may be a base transceiver station (BTS for short) in the time division-synchronous code division multiple access (TD-SCDMA for short) system, an evolved NodeB eNB (eNB for short) in the LTE system, or a next generation NodeB gNB in the 5G system or the new radio (NR) system. In addition, the base station 102 may alternatively be an access point (AP), a transmission reception point (TRP for short), a central unit (CU for short), or another network entity, and may include some or all functions of the foregoing network entities.

The terminal 108, 110 may be a device that provides a user with voice and/or data connectivity, a handheld device with a wireless connection function, or another processing device connected to a wireless modem. The terminal 108, 110 may communicate with one or more core networks by using a radio access network (RAN for short). The terminal device 108, 110 may be a stationary terminal, or may be a mobile terminal such as a mobile phone (or referred to as a "cellular" phone) and a computer with a mobile terminal. For example, the terminal 108, may be a portable, pocket-sized, handheld, computer built-in, or vehicle-mounted mobile apparatus. These terminals exchange voice and/or data with the radio access network. For example, the terminal 108, 110 may be a device such as a personal communications service (PCS for short) phone, a cordless phone, a session initiation protocol (SIP) phone, a wireless local loop (WLL for short) station, or a personal digital assistant (PDA for short). A wireless terminal may also be referred to as a system, a subscriber unit, a subscriber station, a mobile station, a mobile console, a remote station, an access point, a remote terminal, an access terminal, a user terminal, a terminal device, a user agent, a user device, or user equipment.

The relay device 106, 108 may be a relay base station, for example, a micro base station. The relay device 106, 108 may alternatively be a relay terminal, for example, an idle terminal. The relay device 106, 108 may alternatively be a network entity such as a relay transmission/reception node, customer-premises equipment (CPE for short), a relay transceiver, a relay agent, a transmission reception point (TRP for short), or a relay transmission reception point (rTRP for short). In a specific implementation, relay devices 106, 108 may be distributed at a cell edge, to expand coverage of the base station.

Figure 2:
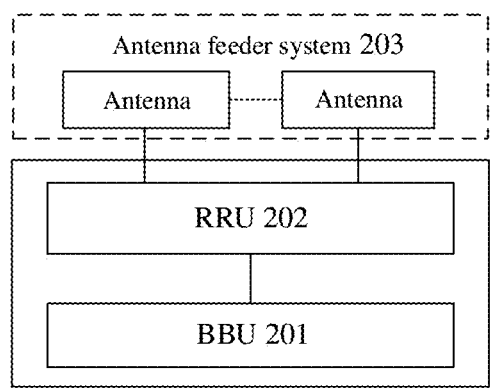
FIG. 2 is a schematic structural diagram of a base station/relay device according to an embodiment of this application.

In the wireless communications system 100, a link between the base station 102 and the relay device 104, 106 and a link between relay devices may be referred to as backhaul links (BL for short). A link between a relay device 104, 106 and the terminal 108, 110 may be referred to as an access link (AL for short). On a transmission path between the base station 102 and the terminal 108, 110, a link whose direction is the same as a direction from the base station to the terminal may be referred to as a downlink, and a link whose direction is the same as a direction from the terminal to the base station may be referred to as an uplink. In the wireless communications system 100, a relay device 104, 106 between the base station and the terminal may be configured to forward a radio signal between the base station and the terminal. Specifically, during downlink transmission, the plurality of relay devices 104, 106 are responsible for forwarding radio signals transmitted by the base station 102, and finally transmit the radio signals to the terminal 108, 110. During uplink transmission, the plurality of relay devices 104, 106 are responsible for forwarding radio signals transmitted by the terminal 108 110, and finally transmit the radio signals to the base station 102. FIG. 2 is a schematic structural diagram of a base station/relay device 102/104/106 according to an embodiment of this application. The base station/relay device 102/104/106 may include a baseband processing unit (BBU) 201 and a remote radio unit (RRU) 202. The RRU 202 is connected to an antenna feeder system 203, and the BBU 201 and the RRU 202 may be disassembled/separated for use as required. For example, the RRU 202 may be remotely located on a cloud platform. A structure shown in FIG. 2 may be a structure of the base station 102, or may be a structure of the relay device 104, 106. The BBU 201 is configured to: implement operation and maintenance of the entire base station 102 or the entire relay device 104, 106; implement signaling processing, radio resource management, and a transmission interface to a packet core network; and implement a physical layer, a media access control layer, L3 signaling, and operation, maintenance, and main control functions. The RRU 202 is configured to: implement conversion between a baseband signal and a radio frequency signal; and implement demodulation of a received radio signal, modulation and power amplification of a sent signal. The antenna feeder system 203 may include a plurality of antennas, and is configured to send and receive radio air interface signals. A person skilled in the art may understand that, in a specific implementation process, the base station/relay device 102/104/106 may further have another general-purpose hardware structure, but is not limited to a hardware structure shown in FIG. 2.

Figure 3:
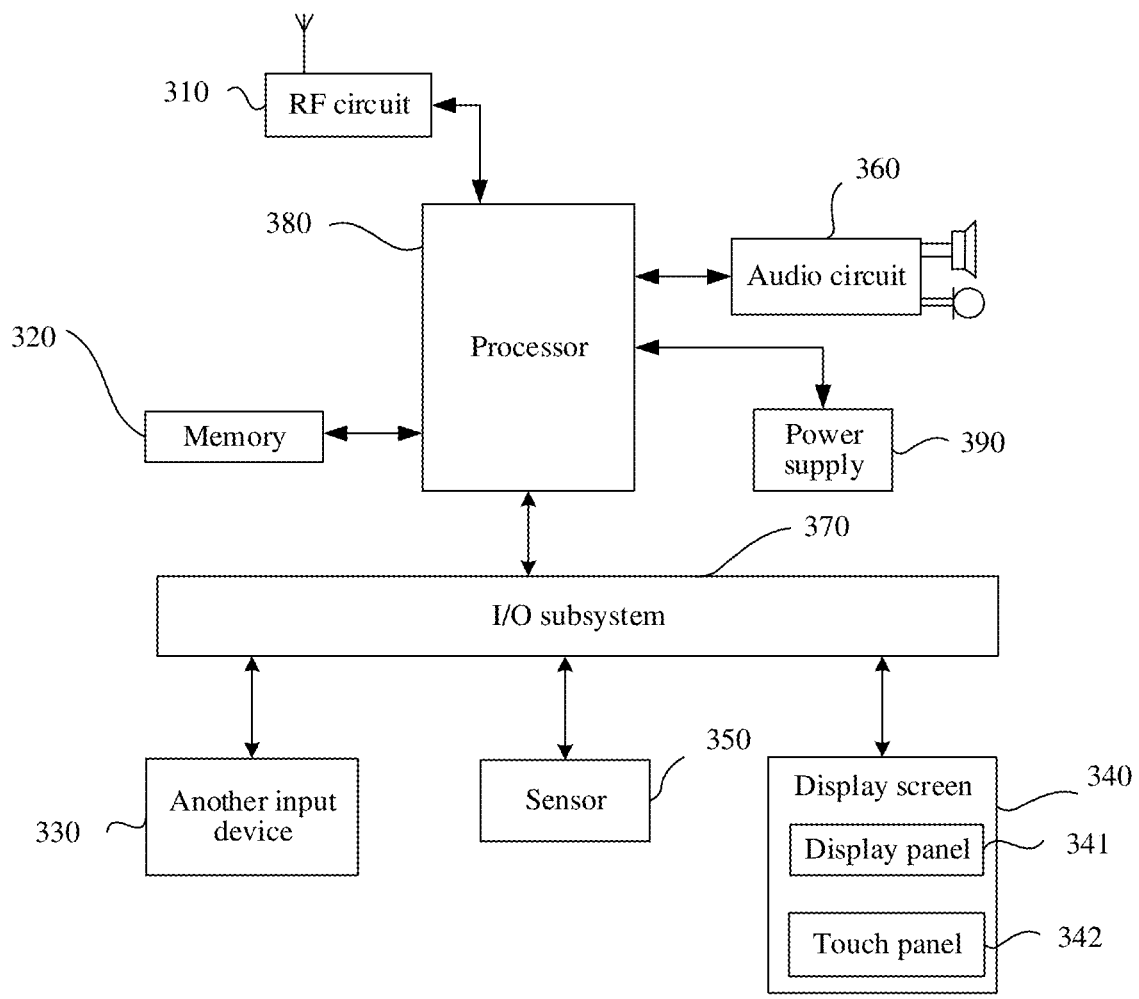
FIG. 3 is a schematic structural diagram of a user device according to an embodiment of this application.

FIG. 3 is a schematic structural diagram of a user device according to an embodiment of this application. Using an example in which the user device is a mobile phone, the mobile phone may include components such as an RF (radio frequency) circuit 310, a memory 320, another input device 330, a display screen 340, a sensor 350, an audio circuit 360, an I/O subsystem 370, a processor 380, and a power supply 390. The following specifically describes each constituent part of the mobile phone with reference to FIG. 3.

The processor 380 is separately connected to the RF circuit 310, the memory 320, the audio circuit 360, and the power supply 390. The I/O subsystem 370 is separately connected to the another input device 330, the display screen 340, and the sensor 350. The RF circuit 310 may be configured to receive and send information, or receive and send a signal in a call process. Particularly, after receiving downlink information from a base station 102, the RF circuit 310 sends the downlink information to the processor 380 for processing. The memory 320 may be configured to store a software program and a module. The processor 380 executes various function applications and data processing of the mobile phone by running the software program and the module that are stored in the memory 320. The another input device 330 may be configured to receive input digit or character information, and generate a keyboard signal input related to user setting and function control of the mobile phone. The display screen 340 may be configured to display information input by a user or information provided for a user, and various menus of the mobile phone, and may further receive user input. The display screen 340 may include a display panel 341 and a touch panel 342. The sensor 350 may be a light sensor, a motion sensor, or another sensor. The audio circuit 360 may provide an audio interface between the user and the mobile phone. The I/O subsystem 370 is configured to control input and output of an external device, and the external device may include an input controller, a sensor controller, and a display controller of another device. The processor 380 is a control center of the mobile phone, is connected to each part of the entire mobile phone through various interfaces and by using various lines, and executes various functions and data processing of the mobile phone by running or executing the software program and/or the module that are/is stored in the memory 320 and invoking data stored in the memory 320, to perform overall monitoring on the mobile phone. The power supply 390 (for example, a battery) is configured to supply power to the foregoing components. Preferably, the power supply may be logically connected to the processor 380 by using a power management system, to implement functions such as charging, discharging, and power consumption management by using the power management system.

Although not shown, the mobile phone may further include functional modules or components such as a camera and a Bluetooth module. Details are not described herein. A person skilled in the art may understand that a structure of the mobile phone shown in FIG. 3 does not constitute a limitation on the mobile phone, and the mobile phone may include more or fewer components than those shown in the figure, combine some components, or have a different component arrangement.

For ease of description, terms used in this application are described.

A first link is a link between a first device and a second device, and the first link includes a backhaul link. A second link is a link between the second device and a third device, and the second link includes a backhaul link or an access link. The first device is a previous-hop device, an upper-level node, or an upstream node of the second device on a link from a base station 102 to a terminal 108, 110. The second device is a next-hop device, an upper-level node, or an upstream node of the first device on the link from the base station 102 to the terminal 108, 110. The second device is a previous-hop device, an upper-level node, or an upstream node of the third device on the link from the base station 102 to the terminal 108, 110. The third device is a next-hop device, an upper-level node, or an upstream node of the second device on the link from the base station 102 to the terminal 108, 110. If the first device is a base station 102, the second device is a first relay device 104, and the first relay device is a next-hop node of the base station, the first link is a backhaul link. Alternatively, if the first device is a second relay device, the second device is a third relay device, and the second relay device is a previous-hop node of the third relay device, the first link is also a backhaul link. If the third device is a terminal, the second link is an access link. If the third device is a fourth relay device, the second link is a backhaul link.

A control channel may be understood as a channel used to transmit control information, and a data channel may be understood as a channel used to transmit data.

A time unit represents a unit of specific duration, and one or more time units are included. The time unit may include a slot, a mini-slot (mini-slot), a subframe, a frame, an OFDM symbol, or the like.

This application provides a scheduling solution. In this solution, resources between a backhaul link and an access link, or between backhaul links are shared. For example, time-division multiplexing, frequency-division multiplexing, or spatial multiplexing may be performed on the resources between the backhaul link and the access link or the resources between the backhaul links. In this way, scheduling of a backhaul link is more flexible. This application may be applicable to a flexible duplex or half-duplex scenario. In this application, dynamic time division duplex (TDD for short) may also be supported. To be specific, link transmission directions of a base station 102 and a relay device 104, 106 may be different at a same moment. For example, when the base station 102 is in a sending state (for example, a downlink direction of an access link), the relay node 104, 106 may be in a receiving state (for example, an uplink direction of the access link). On the contrary, when the base station 102 is in a receiving state (for example, an uplink direction of an access link), the relay node may be in a sending state (for example, a downlink direction of the access link). The dynamic TDD provides a favorable condition for more flexible resource allocation for the backhaul link and the access link.

The following describes the embodiments of the present invention in detail with reference to the accompanying drawings.

Embodiment 1

Figure 4:
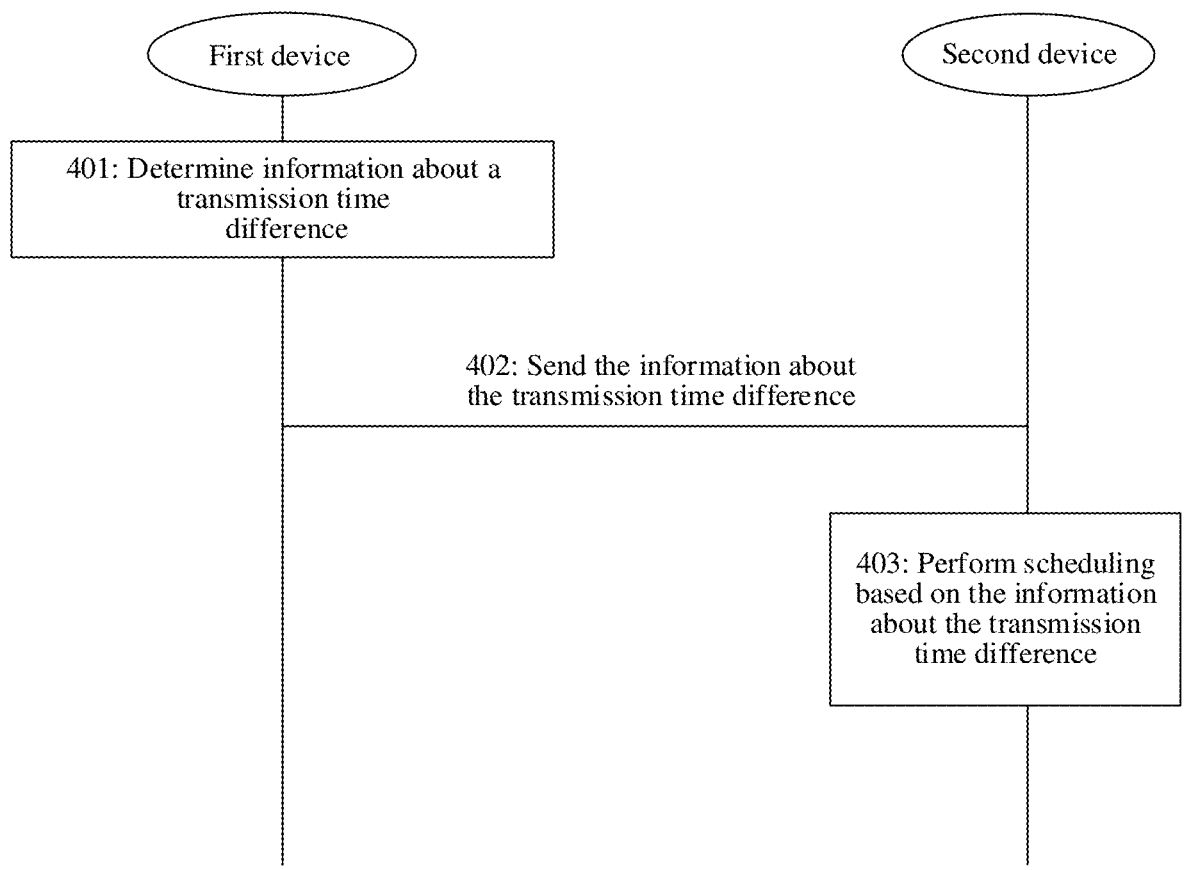
FIG. 4 is a schematic flowchart of a scheduling method according to an embodiment of the present invention.

FIG. 4 is a schematic flowchart of a scheduling method according to this embodiment of the present invention. Referring to FIG. 4, the method is applied to the communications system 100 shown in FIG. 1, and the method includes the following steps.

Step 401: A first device determines information about a transmission time difference.

The transmission time difference is a time difference between a control channel of a first link and a data channel that is of the first link and that is scheduled by the control channel of the first link. The transmission time difference may be a difference between a start moment of transmission on the control channel in the first link and a start moment of transmission on the data channel that is of the first link and that is scheduled by the control channel, or a difference between an end moment of transmission on the control channel in the first link and an end moment of transmission on the data channel that is of the first link and that is scheduled by the control channel. Alternatively, the transmission time difference may be a difference between an end moment of transmission on the control channel in the first link and a start moment of transmission on the data channel that is of the first link and that is scheduled by the control channel, or another time difference between transmission on the control channel in the first link and transmission on the data channel that is of the first link and that is scheduled by the control channel A value of the transmission time difference may be in units of frames, subframes, slots, symbols, or the like. This is not limited herein.

Optionally, the information about the transmission time difference may include at least one of the following information: information about a value N of the transmission time difference, information that the transmission time difference is greater than or equal to M, or information that the transmission time difference is less than or equal to K.

Alternatively, the information about the transmission time difference includes at least one of the following:

information (1) about the transmission time difference: information about a value N of the transmission time difference, where in a scenario not having a high requirement for scheduling flexibility, the information (1) about the transmission time difference may be configured in a semi-static manner, and the information about the transmission time difference may be information about a specific value, for example, the value N;

information (2) about the transmission time difference: information that the transmission time difference is greater than or equal to M or information that the transmission time difference is greater than M;

information (3) about the transmission time difference: information that the transmission time difference is less than or equal to K or information that the transmission time difference is less than K, where in a scenario of the information (2) or (3) about the transmission time difference, the information about the transmission time difference that is notified by the first device to a second device is not a determined value, but indicates a relationship between the transmission time difference and M or K, and the information (2) or (3) about the transmission time difference may be used in scheduling of a second link, for example, used to determine whether to schedule the first link and the second link by using spatial multiplexing;

information (4) about the transmission time difference: information that the transmission time difference is greater than or equal to M or information that the transmission time difference is greater than M, and information about a value N of the transmission time difference; or information (5) about the transmission time difference: information that the transmission time difference is less than or equal to K or information that the transmission time difference is less than K, and information about a value N of the transmission time difference.

In a scenario having a high requirement for scheduling flexibility, the information (4) or (5) about the transmission time difference may be used. After receiving a first message, the second device may determine the value N, where N is greater than or equal to 0. Optionally, the value N may be determined by the first device based on processing delay information of the second device.

A processing delay in this application may be a time from receiving the control channel of the first link by the second device to completing the scheduling of the second link.

M and K are greater than or equal to 0. Optionally, a value of M is greater than or equal to the processing delay of the second device. For example, the value of M is an integer greater than or equal to a minimum processing delay of the second device. The value of M may be determined by the first device based on the processing delay information of the second device. Optionally, a value of K is greater than or equal to the processing delay of the second device. For example, the value of K is an integer less than or equal to the minimum processing delay of the second device. The value of K may be determined by the first device based on the processing delay information of the second device.

N, M, or K may be in units of slots, mini-slots, subframes, frames, OFDM symbols, or the like.

In the two cases of the information (4) or (5) about the transmission time difference, the first device indicates the information about the transmission time difference by using the two pieces of information. First, the first device indicates the relationship between the transmission time difference and M or K. After receiving the relationship that is between the transmission time difference and M or K and that is sent by the first information, the second device may schedule the second link based on the information. Then, the second device may determine a specific scheduling location of the data channel of the first link based on specific information of the value N of the time difference.

Optionally, the second device sends the processing delay information of the second device to the first device. The first device receives the processing delay information of the second device, and determines the information about the transmission time difference based on the received processing delay information of the second device.

Step 402: The first device sends the information about the transmission time difference to the second device.

Optionally, the first device may send the information about the transmission time difference to the second device in at least one of the following manners.

A sending manner (1): The first device may send the information (1) about the transmission time difference to the second device by using higher layer signaling such as radio resource control (RRC for short) signaling or a media access control-control element (MAC-CE for short), or by using physical layer signaling such as downlink control information (DCI for short).

A sending manner (2): The first device sends the information (2) or (3) about the transmission time difference to the second device by using higher layer signaling such as RRC signaling or a MAC-CE.

A sending manner (3): The first device sends the following information to the second device by using higher layer signaling such as RRC signaling or a MAC-CE: information that the transmission time difference is greater than or equal to M or information that the transmission time difference is greater than M. Then, the first device sends the information about the value N of the transmission time difference to the second device by using physical layer signaling such as DCI.

A sending manner (4): The first device sends the following information to the second device by using higher layer signaling such as RRC signaling or a MAC-CE: information that the transmission time difference is less than or equal to K or information that the transmission time difference is less than K. Then, the first device sends the information about the value N of the transmission time difference to the second device by using physical layer signaling such as DCI.

Step 403: The second device receives the information about the transmission time difference that is sent by the first device, and performs scheduling based on the information about the transmission time difference.

Corresponding to step 402, the second device receives the information about the transmission time difference that is sent by the first device in any one of the foregoing four sending manners.

The second device receives, in at least one of the following receiving manners, the information about the transmission time difference that is sent by the first device:

a receiving manner (1): the second device receives the information (1) about the transmission time difference that is sent by the first device by using higher layer signaling or physical layer signaling;

a receiving manner (2): the second device receives the information (2) or (3) about the transmission time difference that is sent by the first device by using higher layer signaling;

a receiving manner (3): the second device receives the following information sent by the first device by using higher layer signaling: the information that the transmission time difference is greater than or equal to M or the information that the transmission time difference is greater than M; and the second device receives the information about the value N that is of the transmission time difference and that is sent by the first device by using physical layer signaling; or a receiving manner (4): the first device receives the following information sent by the second device by using higher layer signaling: the information that the transmission time difference is less than or equal to K or the information that the transmission time difference is less than K; and the first device receives the information about the value N that is of the transmission time difference and that is sent by the second device by using physical layer signaling.

That the second device performs scheduling based on the information about the transmission time difference includes: determining, by the second device based on the information about the transmission time difference, whether a resource needs to be reserved for the data channel of the first link, and/or scheduling, by the second device, the second link based on the information about the transmission time difference.

Optionally, the determining, by the second device based on the transmission time, whether a resource needs to be reserved for the data channel of the first link includes any one of the following scheduling manners.

A scheduling manner (1): When the information about the transmission time difference includes the information (1) about the transmission time difference, if the value N of the transmission time difference is greater than the processing delay of the second device, the second device does not reserve a resource for the data channel of the first link. Optionally, the second device communicates with the first device on the data channel of the first link based on the value N of the transmission time difference. To be specific, the second device determines a location of the data channel of the first link based on the value N of the transmission time difference.

A scheduling manner (2): When the information about the transmission time difference includes the information (1) about the transmission time difference, if the value N of the transmission time difference is less than or equal to the processing delay of the second device, the second device reserves a resource for the data channel of the first link. Optionally, the second device communicates with the first device on the data channel of the first link based on the value N of the transmission time difference. To be specific, the second device determines a location of the data channel of the first link based on the value N of the transmission time difference.

A scheduling manner (3): When the information about the transmission time difference includes the information (2) or (4) about the transmission time difference, the second device does not reserve a resource for the data channel of the first link.

Optionally, when the information about the transmission time difference includes the information (4) about the transmission time difference, the second device communicates with the first device on the data channel of the first link based on the value N of the transmission time difference. To be specific, the second device determines a location of the data channel of the first link based on the value N of the transmission time difference.

A scheduling manner (4): When the information about the transmission time difference includes the information (3) or (5) about the transmission time difference, the second device reserves a resource for the data channel of the first link. Optionally, when the information about the transmission time difference includes the information (5) about the transmission time difference, the second device communicates with the first device on the data channel of the first link based on the value N of the transmission time difference. To be specific, the second device determines a location of the data channel of the first link based on the value N of the transmission time difference.

Optionally, in the foregoing four scheduling manners, if the second device needs to reserve a resource, the method in this embodiment of the present invention may include: notifying, by the first device, the second device of information about the to-be-reserved resource, and receiving, by the second device, the information about the to-be-reserved resource and reserving the to-be-reserved resource. The information about the to-be-reserved resource includes bandwidth information and/or a quantity of occupied OFDM symbols of the to-be-reserved resource.

That the second device schedules the second link includes any one of the following second group of scheduling manners.

A scheduling manner (5): If the second device reserves a resource for the data channel of the first link, the second device schedules the second link on a resource other than the reserved resource. Optionally, in a dynamic TDD mode, spatial multiplexing is performed on a resource occupied by the data channel of the first link and a resource occupied by a data channel of the second link.

A scheduling manner (6): If the second device does not reserve a resource for the data channel of the first link, the second device may dynamically schedule the second link. Optionally, time-division multiplexing, frequency-division multiplexing, or spatial multiplexing is performed on a resource occupied by the data channel of the first link and a resource occupied by a data channel of the second link.

In this embodiment of the present invention, the first device sends the information about the transmission time difference to the second device, and the second device may perform scheduling based on the information about the transmission time difference. This ensures scheduling flexibility. The second device determines, based on the information about the transmission time difference, whether a resource needs to be reserved for the data channel of the first link. If a resource needs to be reserved, the second device may schedule the second link on a resource other than the reserved resource. If a resource does not need to be reserved, the second device may dynamically schedule the second link, so that time-division multiplexing, frequency-division multiplexing, or spatial multiplexing is performed on the data channel of the first link and the data channel of the second link.

Figure 5A:
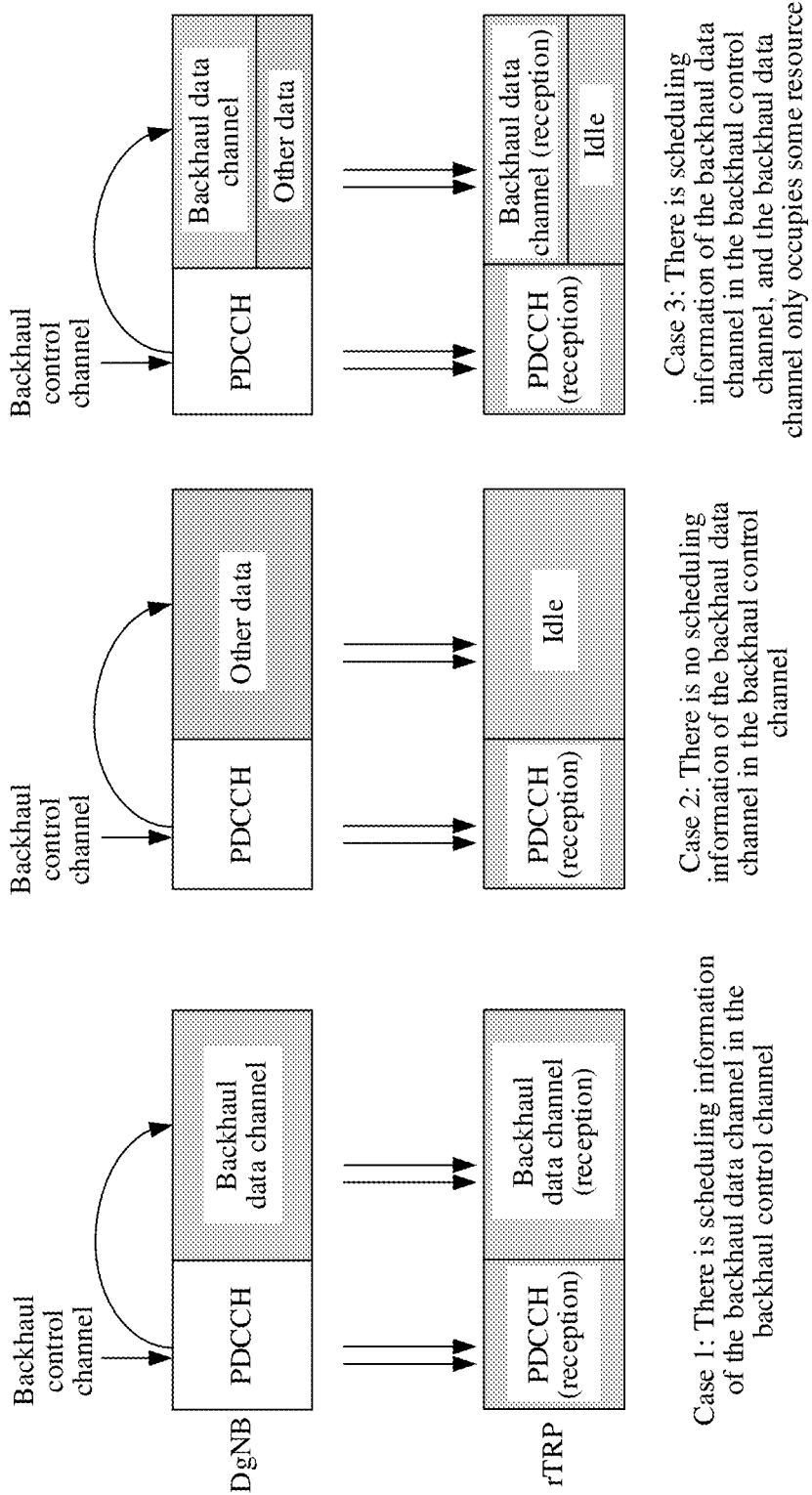
FIG. 5a and FIG. 5b are schematic scheduling diagrams of a backhaul link according to an embodiment of the present invention.
Figure 5B:
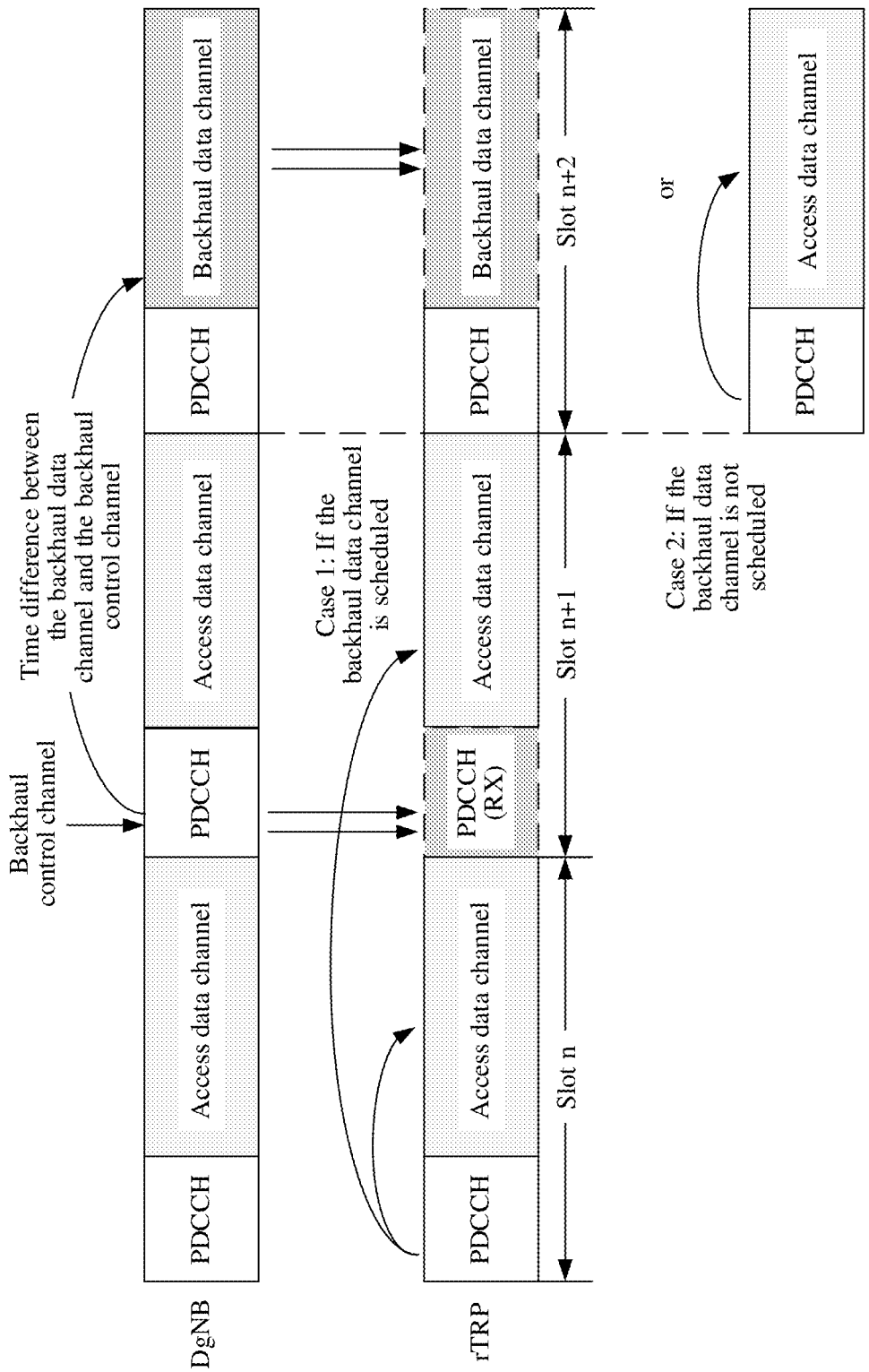

The following describes beneficial effects of this embodiment with reference to schematic scheduling diagrams of backhaul links that are shown in FIG. 5a and FIG. 5b. An example in which the first device is a DgNB, the second device is an rTRP, and the first link is a backhaul link is used for description. In FIG. 5a, if scheduling of a backhaul data channel by a backhaul control channel occurs in a same time unit, under a limited signal processing capability, after receiving the backhaul control channel, the rTRP can learn whether the backhaul data channel is scheduled and learn of a resource location at which the backhaul data channel is scheduled. In cases 2 and 3 shown in FIG. 5a, if the backhaul data channel is not scheduled or the backhaul data channel does not occupy all resources, and the first device does not notify the second device of the information about the transmission time difference, the second device cannot perform scheduling based on the information about the transmission time difference. To be specific, a resource unoccupied by the backhaul data channel cannot be used for data transmission of an access link again. In a case 1 shown in FIG. 5b, a slot n+1 is scheduled for a data channel of an access link, and a slot n+2 is scheduled for a data channel of a backhaul link for use. While in a case 2, if a slot n+2 is not scheduled for a backhaul data channel for use, and the first device notifies the second device of the information about the transmission time difference, the second device can perform scheduling based on the information about the transmission time difference. To be specific, the slot n+2 can be scheduled for the data channel of the access link for use.

Embodiment 2

Figure 6:
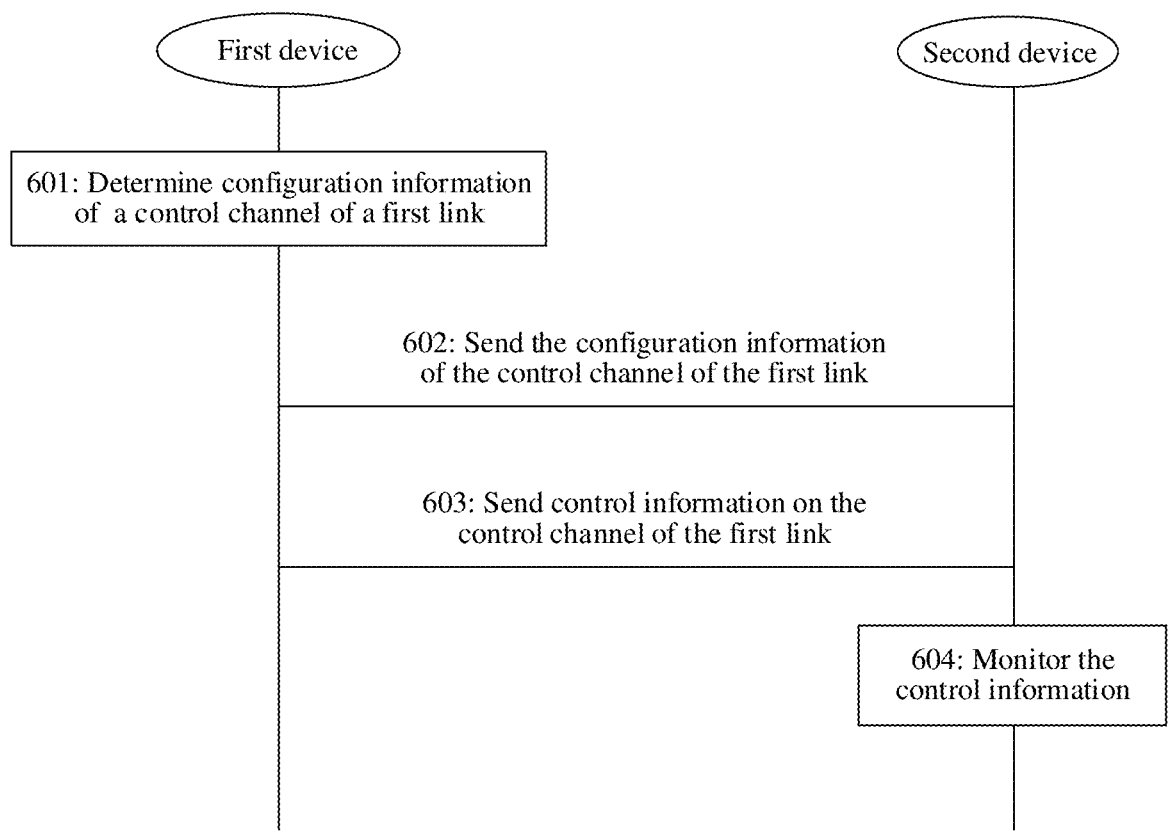
FIG. 6 is a schematic flowchart of a scheduling method according to an embodiment of the present invention.

FIG. 6 is a schematic flowchart of a scheduling method according to this embodiment of the present invention. Referring to FIG. 6, the method is applied to the communications system 100 shown in FIG. 1, and the method includes the following steps.

Step 601: A first device determines configuration information of a control channel of a first link.

The configuration information of the control channel of the first link includes information about a time domain resource occupied by the control channel of the first link. Optionally, the configuration information of the control channel of the first link may further include information about a frequency domain resource occupied by the control channel of the first link.

Figure 7A:
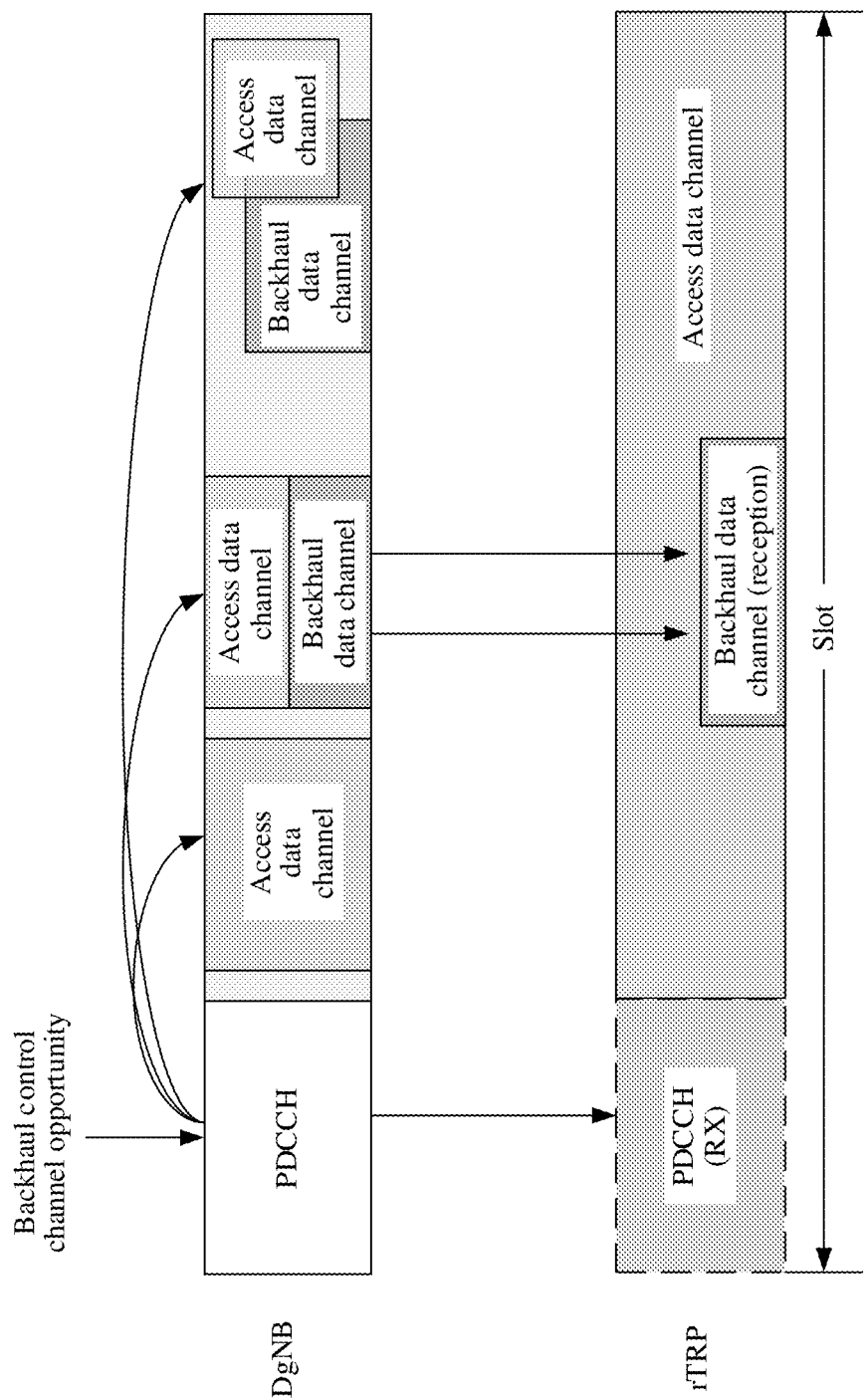
FIG. 7a and FIG. 7b are schematic scheduling diagrams according to an embodiment of the present invention.

Optionally, a time-frequency resource occupied by the control channel of the first link and a time-frequency resource occupied by a control channel of a second link overlap or partially overlap. To be specific, a control resource set (CORESET for short) to which the control channel of the first link belongs and a control resource set to which the control channel of the second link belongs are subsets of a same control resource set. The control resource set may include a time domain resource set and/or a frequency domain resource set. The same control resource set may be used to send both the control channel of the first link and the control channel of the second link. For example, the CORESET to which the control channel of the first link belongs may start from the first OFDM symbol in a slot and last for one, two, or three OFDM symbols. The CORESET to which the control channel of the second link belongs may be several other symbols of the slot, for example, as shown in a schematic scheduling diagram of FIG. 7a. An example in which the first device is a DgNB, the second device is an rTRP, the first link is a backhaul link, and the second link is an access link is used for description. In FIG. 7a, a data channel of a backhaul link and a data channel of an access link are scheduled by a same control channel. To be specific, a resource set of the control channel of the backhaul link is the same as that of the control channel of the access link, and the control channel of the backhaul link is the same as the control channel of the access link.

Optionally, the control resource set may be predefined, and the control resource set represents a set of resources occupied by a downlink control channel. The time-frequency resource occupied by the control channel of the first link and the time-frequency resource occupied by the control channel of the second link may be subsets of the control resource set. If a set of time-frequency resources occupied by the control channel of the first link is predefined, the first device may not notify the second device of the predefined set of time-frequency resources occupied by the control channel of the first link, and the second device blindly detects the control channel of the first link in the predefined set of time-frequency resources.

Figure 7B:
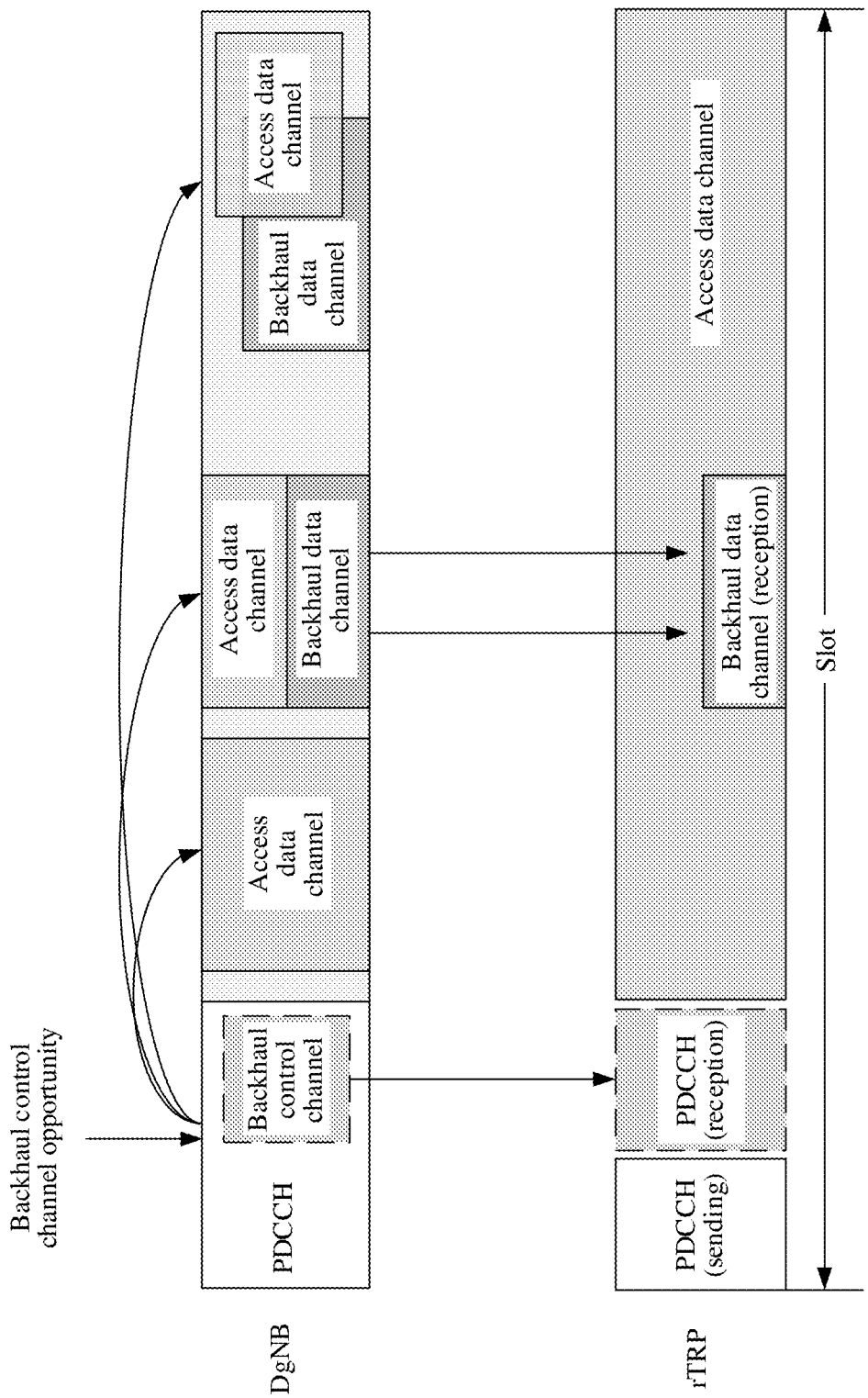

Optionally, time-division multiplexing is performed on the time-frequency resource occupied by the control channel of the first link and the time-frequency resource occupied by the control channel of the second link. To be specific, time-division multiplexing may be performed, by using the configuration information, on the CORESET to which the control channel of the first link belongs and the CORESET to which the control channel of the second link belongs, so that the second device can receive the control channel of the first link and send the control channel of the second link in a same time unit, for example, as shown in a schematic scheduling diagram of FIG. 7b. An example in which the first device is a DgNB, the second device is an rTRP, the first link is a backhaul link, and the second link is an access link is used for description. In FIG. 7b, the rTRP performs time-division multiplexing on a PDCCH (sending), namely, a control channel of an access link, and a PDCCH (reception), namely, a control channel of a backhaul link.

Figure 8:
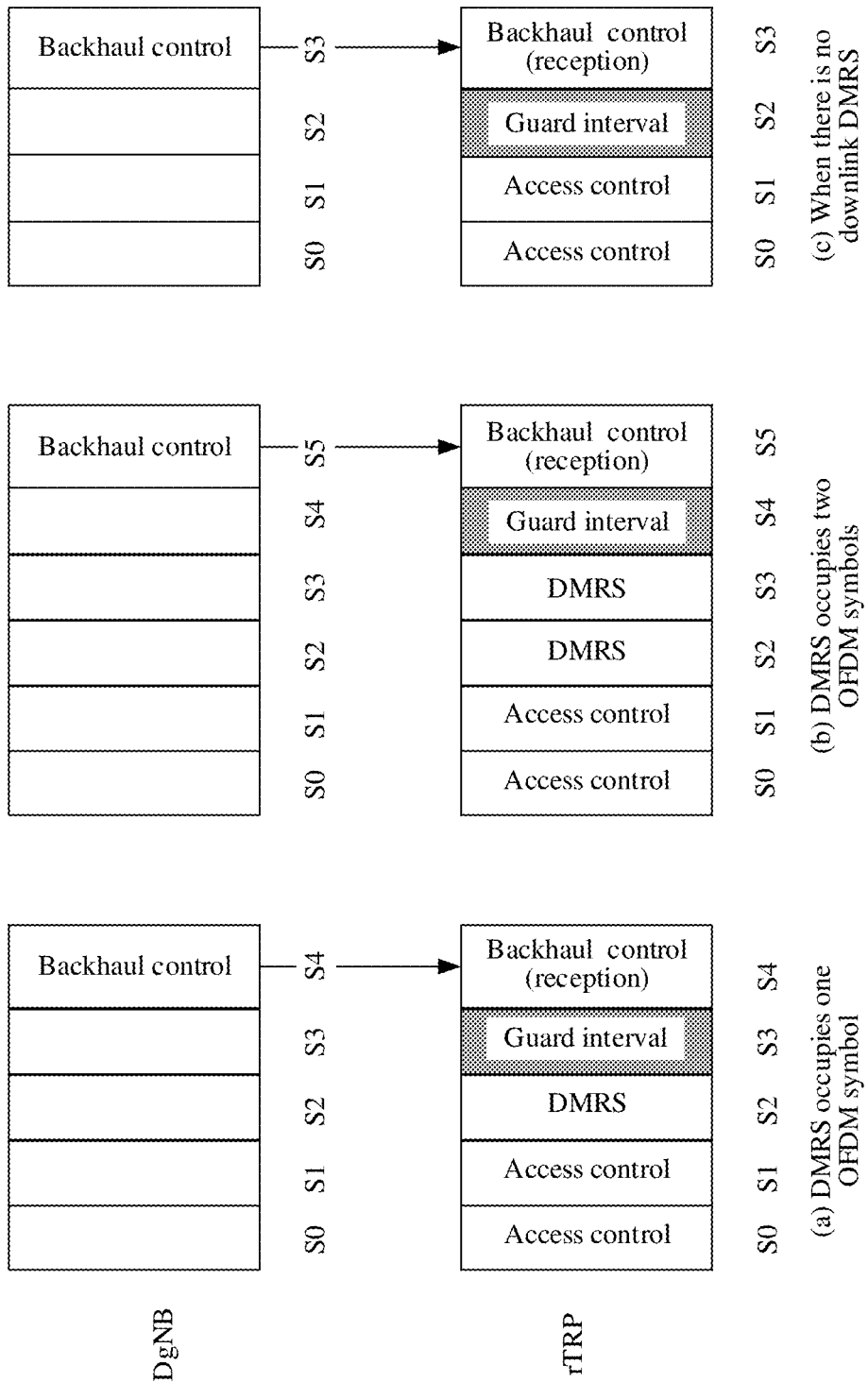
FIG. 8 is a schematic diagram of time-division multiplexing of time-frequency resources occupied by control channels of a first link and a second link according to an embodiment of the present invention.

A specific configuration solution of time-division multiplexing is described by using an example in which time-division multiplexing is performed, in one slot, on a time-frequency resource occupied by the control channel of the first link and a time-frequency resource occupied by the control channel of the second link. In general, at a head of the slot, the second device first sends the control channel of the second link, and then receives the control channel of the first link after a guard interval. However, in one embodiment one symbol is required as a guard interval for switching between sending and receiving of the second device, and the guard interval for sending and receiving cannot conflict with a DMRS. Therefore, when there is a downlink DMRS in the slot, the control channel of the first link starts from the second symbol behind the last DMRS symbol in the slot, and the first OFDM symbol behind the last DMRS symbol in the slot is a guard interval. When there is no downlink DMRS in the slot, the control channel of the first link starts from the second OFDM symbol behind the last OFDM symbol of the control channel of the second link, and the first OFDM symbol behind the last OFDM symbol of the control channel of the second link is a guard interval. FIG. 8 is used as an example for description. In FIG. 8, an example in which the first device is a DgNB, the second device is an rTRP, the first link is a backhaul link, and the second link is an access link is used for description. FIG. 8 is a schematic diagram showing a guard interval existing when an access control channel occupies two OFDM symbols and a DMRS occupies one symbol or two symbols or there is no DMRS, and a location of the first OFDM symbol of a backhaul control channel, where S0, S1, S2, S3, S4, and S5 represent symbols 0, 1, 2, 3, 4, and 5, respectively.

To achieve coordination of this configuration, the second device needs to report, to the first device, a quantity of OFDM symbols occupied by the control channel of the second link and the DMRS, and the first device determines a location of the control channel of the first link based on the reported information. Alternatively, the first device may determine to notify the second device of a location of the control channel of the first link, and the second device determines a quantity of symbols of the access control channel and the downlink DMRS of the second link based on the location of the control channel of the first link.

Optionally, the configuration information of the control channel of the first link includes aperiodic configuration information of the control channel of the first link and/or periodic configuration information of the control channel of the first link.

The aperiodic configuration information of the control channel of the first link may be applicable to transmission of burst backhaul data that is relatively delay-sensitive.

The aperiodic configuration information of the control channel of the first link may include location information of the time domain resource occupied by the control channel of the first link. For example, the configuration information may indicate that the control channel of the first link is to be sent in the $L^{th}$ slot after the configuration information is received. Optionally, the configuration information may alternatively indicate that the control channel of the first link is to be sent for a plurality of times, and indicate a time resource for each sending. Alternatively, the configuration information may indicate an index of an OFDM symbol occupied by the control channel of the first link in one slot. Optionally, the aperiodic configuration information of the control channel of the first link may include the information about the frequency domain resource occupied by the control channel of the first link. For example, the control channel of the first link may be located on several OFDM symbols at a head of a slot, and occupies some or all bandwidths.

The periodic configuration information of the control channel of the first link may include information about a transmission period of the control channel of the first link. To be specific, the information about the time domain resource occupied by the control channel of the first link includes the information about the transmission period of the control channel of the first link. The information about the transmission period of the control channel of the first link includes B time units, where B is an integer greater than or equal to 1. A transmission period of the control channel of the first link may be one slot. For example, in some cases (for example, when a backhaul link has a very large capacity requirement or a backhaul link has a very high delay requirement), the first device may configure the period of the control channel of the first link as one slot.

Optionally, the periodic configuration information of the control channel of the first link may further include offset information of the transmission period of the control channel of the first link. An offset is in units of frames, subframes, slots, or mini-slots.

Figure 9:
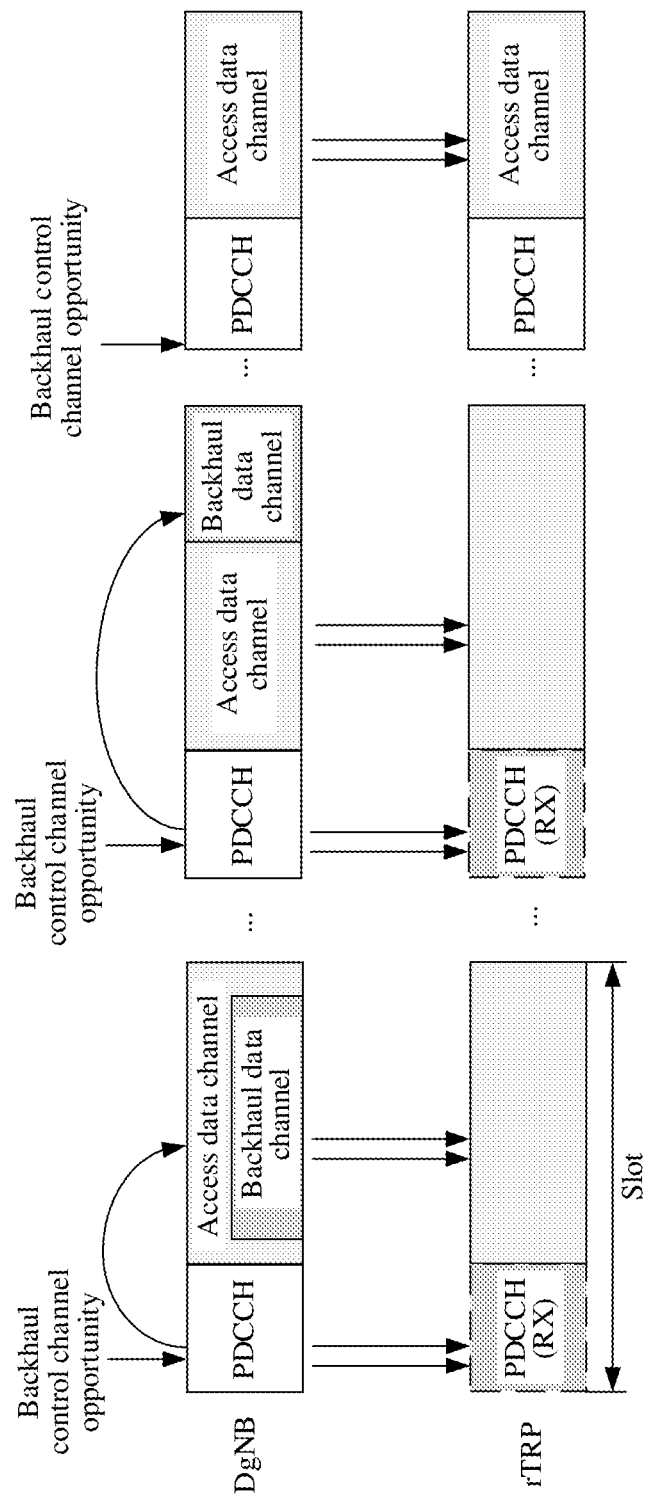
FIG. 9 is a schematic scheduling diagram according to an embodiment of the present invention.

FIG. 9 is used as an example for description. In FIG. 9, an example in which the first device is a DgNB, the second device is an rTRP, the first link is a backhaul link, and the second link is an access link is used for description. It is assumed that a period configured by the DgNB for the rTRP is X slots, an offset is Y slots, and a number of a slot is n. In this case, the rTRP needs to monitor a backhaul control channel in the slot n that meets the following condition: Mod (n, X)=Y.

Mod indicates a modulo operation or a remainder operation. In a TDD mode, n meeting the foregoing equation may alternatively be an uplink slot, or downlink control channel is not configured. In this case, the rTRP may monitor the backhaul control channel in the first slot that is after n and in which the downlink control channel is configured.

Optionally, a plurality of periods and a plurality of offsets may be configured for the second device. The second device monitors the backhaul control channel of the first device on each control channel that is of the first link and that corresponds to the configuration information of the control channel of the first link corresponding to first device.

Step 602: The first device sends the configuration information of the control channel of the first link to the second device, and the second device receives the configuration information that is of the control channel of the first link and that is sent by the first device.

The first device sends the periodic configuration information of the control channel of the first link to the second device by using RRC signaling, and the second device receives the periodic configuration information that is of the control channel of the first link and that is sent by the second device by using the RRC signaling.

The first device sends the aperiodic configuration information of the control channel of the first link to the second device by using DCI or a MAC-CE, and the second device receives the aperiodic configuration information that is of the control channel of the first link and that is sent by the second device by using the DCI or the MAC-CE.

Step 603: The first device sends control information of the first link to the second device on the control channel of the first link.

Step 604: The second device monitors, on the determined control channel of the first link, the control information that is of the first link and that is sent by the first device.

The second device determines the control channel of the first link based on the received configuration information of the control channel of the first link.

If the second device receives the periodic configuration information of the control channel of the first link, the second device may determine the control channel of the first link based on Mod (n, X)=Y, where X is the transmission period of the control channel of the first link, Y is the offset of the transmission period of the control channel of the first link, and n is a location number, such as a slot number or a symbol number, of the time domain resource occupied by the control channel of the first link in a time unit.

Optionally, this embodiment further includes that the first device sends indication information to the second device, where the indication information is used to instruct the second device to activate or deactivate the configuration information of the control channel of the first link. The indication information may be sent by the first device to the second device by using higher layer signaling. If the configuration information of the control channel of the first link is deactivated, the second device monitors all control channels.

Optionally, if the second device does not receive the configuration information that is of the control channel of the first link and that is sent by the first device, the second device monitors all control channels.

In this embodiment of the present invention, the first device notifies the second device of the configuration information of the control channel of the first link, and the second device determines the control channel of the first link based on the configuration information, and receives the control information on the control channel of the first link. This implements flexible scheduling of the first link.

The solutions provided in the embodiments of this application are mainly described above from a perspective of interaction between network elements. It can be understood that, to implement the foregoing functions, the network elements, for example, the first device and the second device, include corresponding hardware structures and/or software modules for performing the functions. A person skilled in the art should easily be aware that, in combination with the examples described in the embodiments disclosed in this specification, in this application, the network elements and algorithms steps may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In the embodiments of this application, the first device and the second device may be divided into functional modules based on the foregoing method embodiments. For example, each functional module may be obtained through division based on each corresponding function, or two or more functions may be integrated in one processing module. The integrated module may be implemented in a form of hardware, or may be implemented in a form of a software functional module. It should be noted that, in the embodiments of this application, division into the modules is exemplary, is merely logical function division, and may be other division in an actual implementation.

Figure 10:
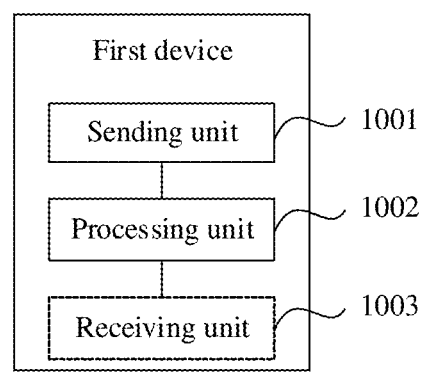
FIG. 10 is a schematic structural diagram of a first device according to an embodiment of the present invention.

When each functional module is obtained through division based on each corresponding function, FIG. 10 is a possible schematic structural diagram of the first device in Embodiment 1. The first device includes a sending unit 1001 and a processing unit 1002. The processing unit 1002 is configured to support a related step in which the first device determines the information about the transmission time difference in Embodiment 1, or is configured to support a related step in which the first device determines the configuration information of the control channel of the first link in Embodiment 2. For example, the first device performs step 401 in FIG. 4 or step 601 in FIG. 6, or another related step that may not be processed by the sending unit 1001 and the receiving unit 1002. The sending unit 1001 is configured to support the first device in performing the step in which the first device sends the information about the transmission time difference in Embodiment 1, or is configured to support the step in which the first device sends the configuration information of the control channel of the first link and the steps of sending the control information and the indication information on the control channel of the first link in Embodiment 2. For example, the sending unit 1001 performs step 402 in FIG. 4, or steps 602 and 603 in FIG. 6. Optionally, the first device further includes a receiving unit 1003, configured to support the first device in performing the related step in which the first device receives the transmission delay information in Embodiment 1.

In hardware implementation, the processing unit 1002 may be a processor, a processing circuit, or the like, the sending unit 1001 may be a transmitter, a sending circuit, or the like, and the receiving unit 1003 may be a receiver, a receiving circuit, or the like. The sending unit 1001 and the receiving unit 1003 may constitute a communications interface.

Figure 11:
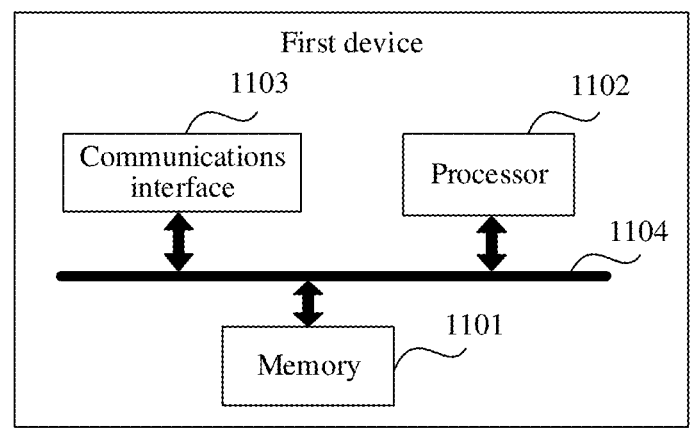
FIG. 11 is another schematic structural diagram of a first device according to an embodiment of the present invention.

FIG. 11 is a possible schematic diagram of a logical structure of the first device in the foregoing embodiments according to the embodiments of this application. The first device includes a processor 1102. In this embodiment of this application, the processor 1102 is configured to control and manage an action of the first device. For example, the processor 1102 is configured to support a related step in which the first device determines the information about the transmission time difference in Embodiment 1 or a related step in which the first device determines the configuration information of the control channel of the first link in Embodiment 2, and/or another process used for the technology described in this specification. Optionally, the first device may further include a memory 1101, a communications interface 1103, or a bus 1104. The processor 1102, the communications interface 1103, and the memory 1101 may be connected to each other by using the bus 1104. The memory 1101 is configured to store code and data of the first device, and the communications interface 1103 is configured to support the first device in communication.

The processor 1102 may be a central processing unit, a general-purpose processor, a digital signal processor, an application-specific integrated circuit, a field programmable gate array or another programmable logical device, a transistor logical device, a hardware component, or any combination thereof. The processor may implement or execute various example logical blocks, modules, and circuits described with reference to content disclosed in this application. Alternatively, the processor may be a combination of processors implementing a computing function, for example, a combination of one or more microprocessors, or a combination of the digital signal processor and a microprocessor. The bus 1104 may be a peripheral component interconnect (PCI) bus, an extended industry standard architecture (EISA) bus, or the like. The bus may be classified into an address bus, a data bus, a control bus, and the like. For ease of representation, only one thick line is used to represent the bus in FIG. 11, but this does not mean that there is only one bus or only one type of bus.

Figure 12:
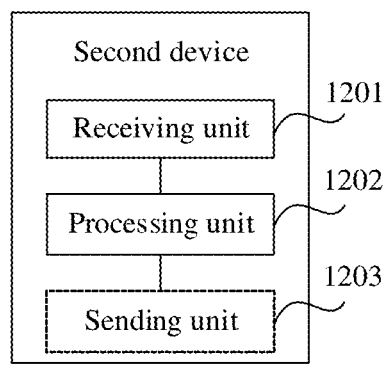
FIG. 12 is a schematic structural diagram of a second device according to an embodiment of the present invention.

When each functional module is obtained through division based on each corresponding function, FIG. 12 is a possible schematic structural diagram of the second device in the foregoing embodiments. The second device includes a receiving unit 1201 and a processing unit 1202. The receiving unit 1201 is configured to support the step in which the second device receives the information about the transmission time difference that is sent in step 402 in FIG. 4 in Embodiment 1, or is configured to support the step in which the second device receives the information about the transmission time difference and the indication information that are sent in steps 602 and 603 in FIG. 6 in Embodiment 2. The processing unit 1202 is configured to support the step in which the second device performs scheduling based on the information about the transmission time difference in Embodiment 1, the step in which the second device controls the receiving unit to monitor, based on the configuration information of the control channel of the first link, the control information that is of the first link and that is sent by the first device to the second device on the control channel of the first link in Embodiment 2, or another related step that may not be processed by the sending unit 1202 and the receiving unit 1201. Optionally, the second device may further include a sending unit 1203, and the sending unit 1203 is configured to support the step in which the second device sends the processing delay information of the second device to the first device.

In hardware implementation, the processing unit 1202 may be a processor, a processing circuit, or the like, the sending unit 1203 may be a transmitter, a sending circuit, or the like, and the receiving unit 1201 may be a receiver, a receiving circuit, or the like. The sending unit 1203 and the receiving unit 1201 may constitute a communications interface.

Figure 13:
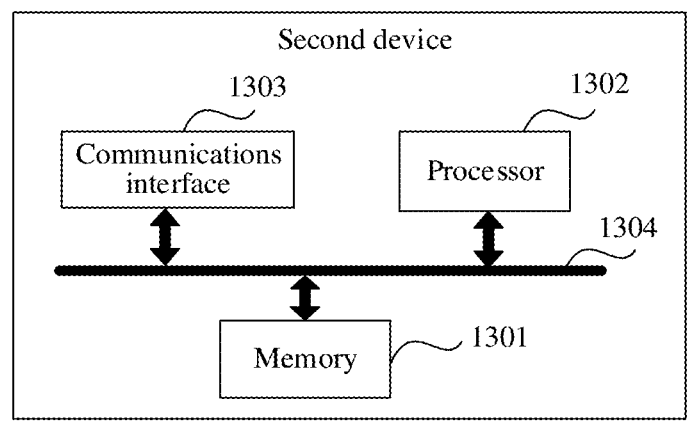
FIG. 13 is another schematic structural diagram of a second device according to an embodiment of the present invention.

FIG. 13 is a possible schematic diagram of a logical structure of the second device in the foregoing embodiments according to the embodiments of this application. The second device includes a processor 1302. In this embodiment of this application, the processor 1302 is configured to control and manage an action of the second device in Embodiment 1 or Embodiment 2. For example, the processor 1302 is configured to support the step in which the second device performs scheduling based on the information about the transmission time difference, or the step in which the second device controls the receiving unit to monitor, based on the configuration information of the control channel of the first link, the control information that is of the first link and that is sent by the first device to the second device on the control channel of the first link. Optionally, the second device may further include a memory 1301, a communications interface 1303, and a bus 1304. The processor 1302, the communications interface 1303, and the memory 1301 are connected to each other by using the bus 1304. The memory 1301 is configured to store program code and data of the second device, and the communications interface 1303 is configured to support the second device in communication. The processor 1302 invokes the code stored in the memory 1301 to perform control management, and the memory 1301 may be coupled to or not coupled to the processor.

The processor 1302 may be a central processing unit, a general-purpose processor, a digital signal processor, an application-specific integrated circuit, a field programmable gate array or another programmable logical device, a transistor logical device, a hardware component, or any combination thereof. The processor may implement or execute various example logical blocks, modules, and circuits described with reference to content disclosed in this application. Alternatively, the processor may be a combination of processors implementing a computing function, for example, a combination of one or more microprocessors, or a combination of the digital signal processor and a microprocessor. The bus 1304 may be a peripheral component interconnect PCI bus, an extended industry standard architecture EISA bus, or the like. The bus may be classified into an address bus, a data bus, a control bus, and the like. For ease of representation, only one thick line is used to represent the bus in FIG. 13, but this does not mean that there is only one bus or only one type of bus.

The solutions provided in the embodiments of this application are mainly described above from a perspective of interaction between network elements. It can be understood that, to implement the foregoing functions, the network elements such as the first device, the second device, and the third device, include corresponding hardware structures and/or software modules for performing the functions. A person skilled in the art should easily be aware that, in combination with the examples described in the embodiments disclosed in this specification, in this application, the network elements and algorithms steps may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In another embodiment of this application, a readable storage medium is further provided. The readable storage medium stores a computer-executable instruction, and when a device (which may be a single-chip microcomputer, a chip, or the like) or a processor may invoke the computer-executable instruction stored in the readable storage medium to perform the steps performed by the first device or the second device in the scheduling method provided in FIG. 4 or FIG. 6. The readable storage medium may include any medium that can store program code, such as a USB flash drive, a removable hard disk, a read-only memory, a random access memory, a magnetic disk, or an optical disc.

In another embodiment of this application, a computer program product is further provided. The computer program product includes a computer-executable instruction, and the computer-executable instruction is stored in a computer-readable storage medium. At least one processor of a device may read the computer-executable instruction from the computer-readable storage medium, and when the at least one processor executes the computer-executable instruction, the device is enabled to implement the steps performed by the first device or the second device in the scheduling method provided in FIG. 4 or FIG. 6.

In another embodiment of this application, a communications system is further provided. The communications system includes a plurality of devices, and the plurality of devices include a first device, a second device, and a third device. The first device may be the first device provided in FIG. 10 or FIG. 11, and is configured to perform the steps performed by the first device in the scheduling method provided in FIG. 4 or FIG. 6; and/or the second device may be the second device provided in FIG. 12 or FIG. 13, and is configured to perform the steps performed by the second device in the scheduling method provided in FIG. 4 or FIG. 6.

Finally, it should be noted that the foregoing descriptions are merely specific implementations of this application, but are not intended to limit the protection scope of this application. Any variation or replacement within the technical scope disclosed in this application shall fall within the protection scope of this application. Therefore, the protection scope of this application shall be defined by the protection scope of the claims.

Still another aspect of this application provides a device. The device includes a processor, and the processor runs code in a memory, so that the device performs the foregoing methods. The memory stores the code and data, the memory is located in the device, and the memory is coupled to the processor. The memory may alternatively be located outside the device.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer program instructions are loaded and executed on a computer, the procedure or functions according to the embodiments of the present invention are all or partially generated. The computer may be a general-purpose computer, a special-purpose computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, Solid State Disk (SSD)), or the like.

In summary, the foregoing descriptions are merely preferred embodiments of the present invention, but are not intended to limit the protection scope of the present invention. Any modification, equivalent replacement, or improvement made within the spirit and principle of the present invention as defined by the claims shall fall within the protection scope of the present invention.

What is claimed is:

1. A scheduling method, comprising: receiving, by a second device, information about a transmission time difference that is sent by a first device, wherein the transmission time difference is a time difference between a control channel of a first link and a data channel that is of the first link and that is scheduled by the control channel of the first link; wherein the first link comprises a link between the first device and the second device; wherein the first device comprises a base station and the second device comprises a first relay device, or the first device comprises a second relay device and the second device comprises a third relay device; wherein the control channel of the first link comprises a channel used to send control information on the first link; and the data channel of the first link comprises a channel used to send data on the first link; determining, by the second device based on the information about the transmission time difference, whether to reserve a resource for the data channel of the first link, including performing a comparison between the transmission time difference and a processing delay; and performing, by the second device, scheduling a second link based on the information about the transmission time difference, wherein the second link is a link between the second device and a third device, and the third device comprises a terminal or a fourth relay device;

wherein the information about the transmission time difference further comprises at least one of the following: information (1) about the transmission time difference comprising: information about a value N of the transmission time difference; information (2) about the transmission time difference comprising: information that the transmission time difference is greater than or equal to M or information that the transmission time difference is greater than M; information (3) about the transmission time difference comprising: information that the transmission time difference is less than or equal to K or information that the transmission time difference is less than K; information (4) about the transmission time difference comprising: information that the transmission time difference is greater than or equal to M or information that the transmission time difference is greater than M, and information about a value N of the transmission time difference; or information (5) about the transmission time difference comprising: information that the transmission time difference is less than or equal to K or information that the transmission time difference is less than K, and information about a value N of the transmission time difference, wherein N is greater than or equal to 0, M is greater than or equal to 0, and K is greater than or equal to 0, wherein the determining, by the second device based on the information about the transmission time difference, whether a resource needs to be reserved for the data channel of the first link comprises:

performing a comparison between the transmission time difference and a processing delay, and in response to the comparison, implementing at least one of the following manners:

a scheduling manner (1): in response to the information about the transmission time difference comprising the information (1) about the transmission time difference, and in response to the value N of the transmission time difference being greater than the processing delay of the second device, the second device does not reserve a resource for the data channel of the first link;

and a scheduling manner (2): in response to the information about the transmission time difference comprising the information (1) about the transmission time difference, and in response to the value N of the transmission time difference being less than or equal to the processing delay of the second device, the second device reserves a resource for the data channel of the first link.

2. The method according to claim 1, wherein the receiving, by a second device, information about a transmission time difference that is sent by a first device comprises: receiving, by the second device in at least one of the following manners, the information about the transmission time difference that is sent by the first device: a receiving manner (1): the second device receives the information (1) about the transmission time difference that is sent by the first device by using higher layer signaling or physical layer signaling; a receiving manner (2): the second device receives the information (2) or (3) about the transmission time difference that is sent by the first device by using higher layer signaling; a receiving manner (3): the second device receives the following information sent by the first device by using higher layer signaling: the information that the transmission time difference is greater than or equal to M or the information that the transmission time difference is greater than M; and the second device receives the information about the value N that is of the transmission time difference and that is sent by the first device by using physical layer signaling; or a receiving manner (4): the second device receives the following information sent by the first device by using higher layer signaling: the information that the transmission time difference is less than or equal to K or the information that the transmission time difference is less than K; and the second device receives the information about the value N that is of the transmission time difference and that is sent by the first device by using physical layer signaling.

3. The method according to claim 1, wherein the performing, by the second device, scheduling based on the information about the transmission time difference further comprises scheduling, by the second device, a second link based on the information about the transmission time difference, wherein the second link is a link between the second device and a third device, and the third device comprises a terminal or a fourth relay device.

4. The method according to claim 1, further comprising in response to the comparison, implementing a scheduling manner (4): when the information about the transmission time difference comprises the information (3) or (5) about the transmission time difference, the second device reserves a resource for the data channel of the first link.

5. The method according to claim 1, further comprising: when the information about the transmission time difference further comprises the value N of the transmission time difference, determining, by the second device, a location of the data channel of the first link based on the value N of the transmission time difference.

6. The method according to claim 3, wherein the scheduling, by the second device, a second link based on the information about the transmission time difference comprises at least one of the following manners: a scheduling manner (5): if the second device reserves a resource for the data channel of the first link, the second device schedules the second link on a resource other than the reserved resource; or a scheduling manner (6): if the second device does not reserve a resource for the data channel of the first link, the second device dynamically schedules the second link.

7. A second device, comprising: a receiver, configured to receive information about a transmission time difference that is sent by a first device, wherein the transmission time difference is a time difference between a control channel of a first link and a data channel that is of the first link and that is scheduled by the control channel of the first link; the first link comprises a link between the first device and the second device; wherein the first device comprises a base station and the second device comprises a first relay device, or the first device comprises a second relay device and the second device comprises a third relay device; wherein the control channel of the first link comprises a channel used to send control information of a backhaul link on the first link; and the data channel of the first link comprises a channel used to send data on the first link; determining, by the second device based on the information about the transmission time difference, whether to reserve a resource for the data channel of the first link, including performing a comparison between the transmission time difference and a processing delay; and a processor, configured to perform scheduling of a second link based on the information about the transmission time difference, wherein the second link is a link between the second device and a third device, and the third device comprises a terminal or a fourth relay device;

wherein the information about the transmission time difference further comprises at least one of the following: information (1) about the transmission time difference comprising: information about a value N of the transmission time difference; information (2) about the transmission time difference comprising: information that the transmission time difference is greater than or equal to M or information that the transmission time difference is greater than M; information (3) about the transmission time difference comprising: information that the transmission time difference is less than or equal to K or information that the transmission time difference is less than K; information (4) about the transmission time difference comprising: information that the transmission time difference is greater than or equal to M or information that the transmission time difference is greater than M, and information about a value N of the transmission time difference; or information (5) about the transmission time difference comprising: information that the transmission time difference is less than or equal to K or information that the transmission time difference is less than K, and information about a value N of the transmission time difference, wherein N is greater than or equal to 0, M is greater than or equal to 0, and K is greater than or equal to 0;

wherein the processor is configured to determine, in at least one of the following manners, whether the resource needs to be reserved for the data channel of the first link: a scheduling manner (1): in response to the information about the transmission time difference comprises the information (1) about the transmission time difference, and in response to the value N of the transmission time difference being greater than a processing delay of the second device, the processor does not reserve a resource for the data channel of the first link;

and a scheduling manner (2): in response to the information about the transmission time difference comprises the information (1) about the transmission time difference and in response to the value N of the transmission time difference being less than or equal to a processing delay of the second device, the processor reserves a resource for the data channel of the first link.

8. The device according to claim 7, wherein the receiver is configured to receive, in at least one of the following manners, the information about the transmission time difference that is sent by the first device: a receiving manner (1): the receiver receives the information (1) about the transmission time difference that is sent by the first device by using higher layer signaling or physical layer signaling; a receiving manner (2): the receiver receives the information (2) or (3) about the transmission time difference that is sent by the first device by using higher layer signaling; a receiving manner (3): the receiver receives the following information sent by the first device by using higher layer signaling: the information that the transmission time difference is greater than or equal to M or the information that the transmission time difference is greater than M; and the receiver receives the information about the value N that is of the transmission time difference and that is sent by the first device by using physical layer signaling; or a receiving manner (4): the receiver receives the following information sent by the first device by using higher layer signaling: the information that the transmission time difference is less than or equal to K or the information that the transmission time difference is less than K; and the receiver receives the information about the value N that is of the transmission time difference and that is sent by the first device by using physical layer signaling.

9. The device according to claim 7, wherein the processor is configured to: determine, based on the information about the transmission time difference, whether a resource needs to be reserved for the data channel of the first link, and/or schedule a second link based on the information about the transmission time difference, wherein the second link is a link between the second device and a third device, and the third device comprises a terminal or a fourth relay device.

10. The device according to claim 7, wherein the processor is further configured to determine-whether the resource needs to be reserved for the data channel of the first link by: a scheduling manner (4): when the information about the transmission time difference comprises the information (3) or (5) about the transmission time difference, the processor reserves a resource for the data channel of the first link.

11. The device according to claim 7, wherein the processor is configured to schedule the second link in at least one of the following manners: a scheduling manner (5): if the processor reserves a resource for the data channel of the first link, the processor schedules the second link on a resource other than the reserved resource; or a scheduling manner (6): if the processor does not reserve a resource for the data channel of the first link, the processor dynamically schedules the second link.

* * * * *